(12) United States Patent
Kato et al.

(10) Patent No.: US 7,933,028 B2
(45) Date of Patent: Apr. 26, 2011

(54) IMAGE RECORDING SYSTEM AND PROGRAM

(75) Inventors: Shinji Kato, Osaka (JP); Shuhji Fujii, Kyoto (JP); Syoichiro Yoshiura, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1020 days.

(21) Appl. No.: 11/636,967

(22) Filed: Dec. 12, 2006

(65) Prior Publication Data

US 2007/0146769 A1    Jun. 28, 2007

(30) Foreign Application Priority Data

Dec. 27, 2005 (JP) ................................. 2005-375441

(51) Int. Cl.
*G06F 3/12* (2006.01)

(52) U.S. Cl. ..................... 358/1.13; 358/1.15; 358/1.14; 399/38

(58) Field of Classification Search ........ 358/1.13–1.16; 399/38
See application file for complete search history.

(56) References Cited

U.S. PATENT DOCUMENTS

| | | | |
|---|---|---|---|
| 5,150,167 A | 9/1992 | Gonda et al. | |
| 5,548,390 A | 8/1996 | Sugisaki et al. | |
| 5,867,060 A * | 2/1999 | Burkett et al. | 330/2 |
| 6,348,971 B2 * | 2/2002 | Owa et al. | 358/1.15 |
| 6,813,037 B1 * | 11/2004 | Collard | 358/1.15 |
| 7,080,269 B2 * | 7/2006 | Baumgartner et al. | 713/320 |
| 2004/0158755 A1 * | 8/2004 | Mitsubori et al. | 713/323 |

FOREIGN PATENT DOCUMENTS

| | | |
|---|---|---|
| JP | 1-112275 A | 4/1989 |
| JP | 2-215623 A | 8/1990 |
| JP | 4-119866 A | 4/1992 |
| JP | 7-237336 A | 9/1995 |
| JP | 8-305221 A | 11/1996 |
| JP | 11-157172 A | 6/1999 |
| JP | 2002-103750 A | 4/2002 |
| JP | 2005-88288 A | 4/2005 |

* cited by examiner

*Primary Examiner* — Chan S Park
(74) *Attorney, Agent, or Firm* — Birch, Stewart, Kolasch & Birch, LLP

(57) ABSTRACT

A bypass transporting path apparatus is disposed on a color image recording apparatus and a transporting path connecting apparatus is disposed between a front portion of a monochrome image recording apparatus and a rear portion of the color image recording apparatus. This system includes an operational state monitoring portion that monitors the operational states of the color image recording apparatus and the monochrome image recording apparatus, and a power supply controlling portion that performs control based on the operational states of the color image recording apparatus and the monochrome image recording apparatus to shift any one image recording apparatus to a power saving state and to make the other image recording apparatus wait in a recordable state.

11 Claims, 11 Drawing Sheets

IMAGE RECORDING SYSTEM AND PROGRAM

CROSS-NOTING PARAGRAPH

This Nonprovisional application claims priority under 35 U.S.C. §119 (a) on Patent Application No. 2005-375441 filed in JAPAN on Dec. 27, 2005, the entire contents of which are hereby incorporated herein by references.

FIELD OF THE INVENTION

The present invention relates generally to an image recording system and a program, and more particularly, to an image recording system including two image recording apparatuses each capable of recording independently images and a program to be incorporated executably in the system.

BACKGROUND OF THE INVENTION

Today, copying machines, facsimile machines, printing apparatuses, etc., are indispensable for paperwork in offices. These copying machines, facsimile machines, printing apparatuses, etc., are each configured based on an image recording apparatus. Recently, an image recording apparatus is drawing attention as a multi-function peripheral incorporating all the functions of a copying machine, a facsimile machine, a printing apparatus, etc. The image recording apparatus includes as a basic function of recording an image such as characters and charts onto a recording medium such as recording paper in the form of a sheet. Recording of an image can be recording of a monochrome image and recording of a color image.

Recently, due to the increase of the amount of the paperwork, improvement of the processing speed of the image recording apparatus is demanded to the above image recording apparatus. Because an image recording apparatus is an apparatus that records an image, the improvement of the processing speed is, in other words, improvement of the speed of recording onto a recording paper sheet that is a recording medium and ejecting the paper sheet. Therefore, improvement of the number of sheets of recording paper that are recorded and ejected per unit time is demanded.

In response to such demand, in addition to a method of facilitating the improvement of the processing speed of the image recording apparatus itself, a, method of improving the processing speed comprehensively by using a plurality of image recording apparatuses can be contemplated. To cope with the above demand in such a viewpoint, various proposals have been made (see, for example, Japanese Laid-Open Patent Publication Nos. H01-112275 and H08-305221).

Japanese Laid-Open Patent Publication No. H01-112275 describes an image forming apparatus that includes both of a color image forming apparatus and a monochrome electronic photograph apparatus.

Japanese Laid-Open Patent Publication No. H08-305221 describes a technique that facilitates the improvement of the processing speed by configuring a color printing apparatus using a plurality of color image forming apparatuses and adapting the color printing apparatus to configure the color image forming apparatuses to output continuously a large amount of prints and eject the prints at a high speed placing the prints in order of page number thereof on bins in a common sorter by controlling the printing process in each color image forming apparatus. The color printing apparatus described in Japanese Laid-Open Patent Publication No. H08-305221 operates two color image forming apparatuses simultaneously to improve the speed of the processing thereof.

Generally, an image recording apparatus is caused to process at one time one image recording job that executes a series of image recording processes, that is, one image recording job that executes image recording consecutively of images each of which is independent for each page onto a plurality of recording paper sheets in order of page number. In this regard, same procedure as above is also taken in a color printing apparatus described in Japanese Laid-Open Patent Publication No. H8-305221 that is configured using a plurality of color image forming apparatuses to facilitate the improvement of the processing speed thereof. That is, the color printing apparatus described in Japanese Laid-Open Patent Publication No. H8-305221 processes one image recording job at one time. The apparatus facilitates improvement of the processing speed thereof by processing in a distributed manner using a plurality of color image forming apparatuses. Therefore, the plurality of image forming apparatuses configuring such a color printing apparatus must be all the same type of apparatuses, that is, color image forming apparatuses.

In the conventional image recording system including a plurality of image recording apparatuses such as above Japanese Laid-Open Patent Publication No. H01-112275 and H08-305221, if a print job is not accepted for a predetermined time period after the system is started, the entire system is automatically shifted to an energy saving mode to reduce energy consumption. If the system accepted a print job after the system is shifted to the energy saving mode, any one or both of the image recording apparatuses returns to a recordable state.

However, since it takes time for the image recording apparatus to return to the recordable state when a print job is accepted at the time of the energy saving mode, it is problematic that a print process cannot be performed smoothly.

Although it is envisioned to allow the both image recording apparatuses to constantly wait in the recordable state for this problem, it is not preferable from a standpoint of energy saving to maintain the wait state even when a print job is not input. Therefore, in the above image recording system, a system configuration has been needed which can accelerate a process and save energy at the same time.

SUMMARY OF THE INVENTION

An object of the present invention is to provide an image recording system including two image recording apparatuses that can independently record images, shifting one apparatus to a power saving state, and making the other apparatus wait in a recordable state, based on an operational state of each image recording apparatus, and a program for incorporation into the system in an executable manner.

Another object of the present invention is to provide an image recording system formed by arranging first and second image recording apparatuses that can independently record images, the system comprising an operational state monitoring portion that monitors the operational states of the first image recording apparatus and the second image recording apparatus and a power supply controlling portion that performs control based on the operational states of the first image recording apparatus and the second image recording apparatus to shift any one image recording apparatus to a power saving state and to make the other image recording apparatus wait in a recordable state.

Another object of the present invention is to provide an image recording system, wherein with regard to the first image recording apparatus and the second image recording apparatus, the first image recording apparatus is a color image recording apparatus including a monochrome image recording function and the second image recording apparatus is a monochrome image recording apparatus.

Another object of the present invention is to provide an image recording system, wherein if a predetermined time has elapsed while both image recording apparatuses are waiting in a recordable state, the power supply controlling portion shifts the second image recording apparatus to the power saving state and makes the first image recording apparatus wait in the recordable state.

Another object of the present invention is to provide an image recording system, wherein when consumables necessary for recording an image of either the first image recording apparatus or the second image recording apparatus run out, the power supply controlling portion shifts the image recording apparatus running out of the consumables to the power saving state and makes the other image recording apparatus wait in the recordable state.

Another object of the present invention is to provide an image recording system, wherein the second image recording apparatus can be set to be used preferentially and wherein all the consumables are used first in the second image recording apparatus.

Another object of the present invention is to provide an image recording system, wherein the remaining amount of the consumables necessary for recording an image of each image recording apparatus can be counted and wherein all the consumables are used first on the side where the counted amount of the remaining consumables is less than a predetermined amount.

Another object of the present invention is to provide an image recording system, wherein the image recording apparatus allowed to perform a recording process is selected depending on a type of a print job accepted by the image recording system and wherein if the selected image recording apparatus is in the power saving state, the power supply controlling portion returns the image recording apparatus to the recordable state.

Another object of the present invention is to provide an image recording system, wherein a controlling portion of the first image recording apparatus acts as the power supply controlling portion, or the power supply controlling portion and the operational state monitoring portion, to control a controlling portion of the second image recording apparatus.

Another object of the present invention is to provide an image recording system, wherein the controlling portions of the both image recording apparatuses include a monitoring portion that monitors the other image recording apparatus through the controlling portion of the other image recording apparatus, and the power supply controlling portion, or the power supply controlling portion and the operational state monitoring portion.

Another object of the present invention is to provide an image recording system, comprising a common controlling portion incorporated into a housing located between the first image recording apparatus and the second image recording apparatus, the common controlling portion acting as the power supply controlling portion, or the power supply controlling portion and the operational state monitoring portion, to control both the controlling portion of the first image recording apparatus and the controlling portion of the second image recording apparatus.

Another object of the present invention is to provide a program for incorporation into the controlling portion of the first image recording apparatus in the image recording system, the program allowing a computer to function as the power supply controlling portion, or the power supply controlling portion and the operational state monitoring portion.

Another object of the present invention is to provide a program for incorporation into the controlling portions of the both image recording apparatuses in the image recording system, the program allowing a computer to function as the power supply controlling portion, or the power supply controlling portion and the operational state monitoring portion.

Another object of the present invention is to provide a program for incorporation into the common controlling portion in the image recording system, the program allowing a computer to function as the power supply controlling portion, or the power supply controlling portion and the operational state monitoring portion.

DETAILED DESCRIPTION OF THE INVENTION

Figure 1:
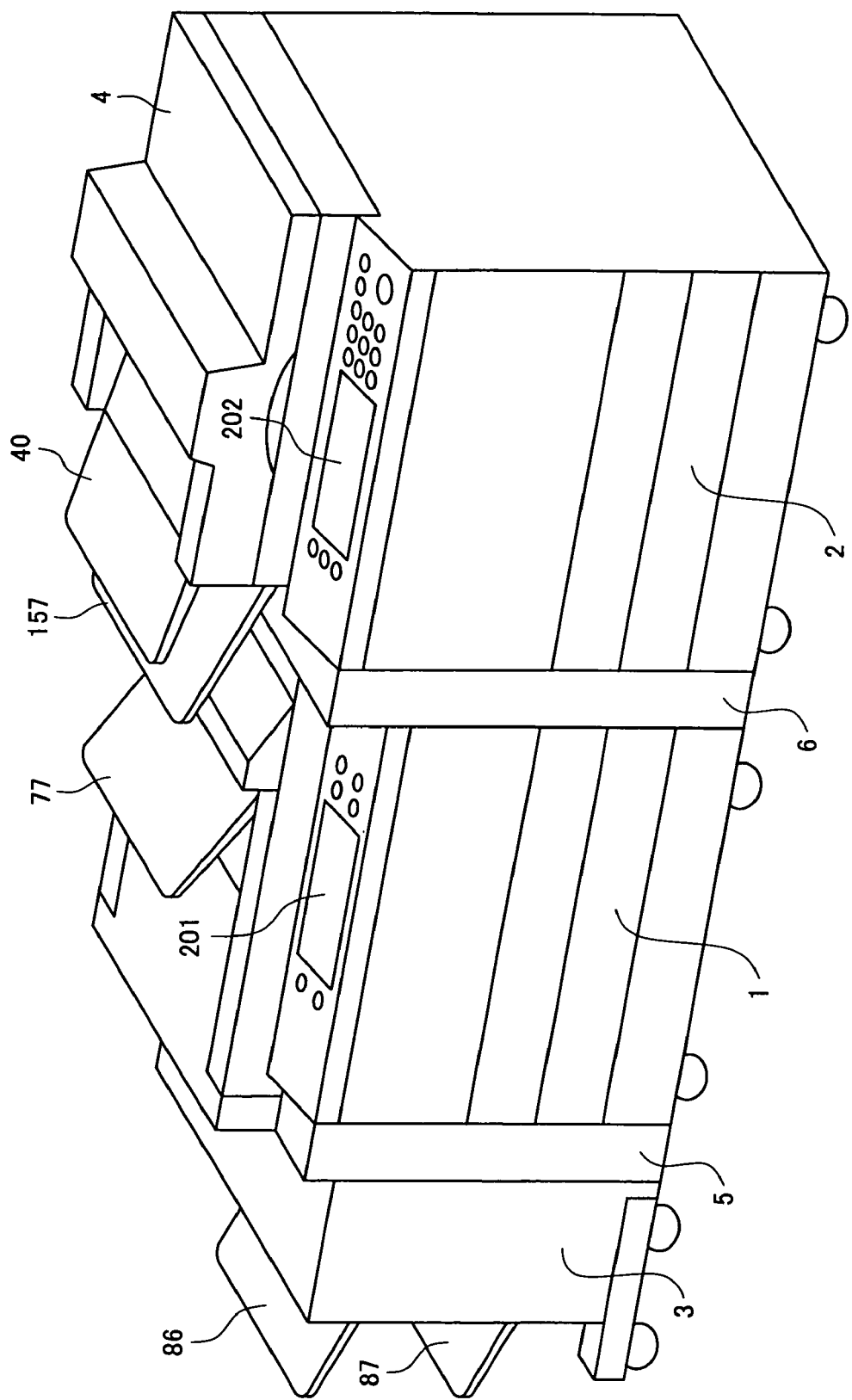
FIG. 1 is a view of the appearance of the configuration of an image recording system according to an embodiment of the present invention.

An image recording system according to the present invention (hereinafter, "the present system") is configured by disposing side by side a first and a second image recording apparatuses each of which can record images independently and is configured by disposing adjacent to the first image recording apparatus (on the opposite side of the side of the second image recording apparatus) a common recorded item containing portion that contains recorded items outputted from the first image recording apparatus and recorded items outputted from the second image recording apparatus. That is, in the present system, the recorded item containing portion, the first image recording apparatus, and the second image recording apparatus are disposed in this order. A housing may be provided between the first image recording apparatus and the second image recording apparatus to connect these apparatuses with each other. Each of the first image recording apparatus and the second image recording apparatus includes a copying function, a printer function, a network printer function, etc., similarly to an ordinary apparatus called "multi-function peripheral" and executes image recording thereof using these functions. However, the apparatuses do not need to include all of these functions.

The present system includes a power supply controlling portion. The power supply controlling portion is a portion that performs control based on an operational state of each of two image recording apparatuses to shift any one image recording apparatus to a power saving state (energy saving mode) and to make the other image recording apparatus wait in a recordable state. This power supply controlling portion can make any one of two image recording apparatuses wait in the power saving state and the other wait in the recordable state to save energy and accelerate a process at the same time.

The present system will be described with referring to FIGS. 1 to 8 and taking an example of the case where the first image recording apparatus is a color image recording apparatus having a monochrome image recording function and the second image recording apparatus is a monochrome image recoding apparatus. However, in the cases other than the above case, the present invention is preferably applicable where the first image recording apparatus and the second image recording apparatus respectively have performance such as outputting speeds that are different from each other or where those apparatuses respectively have functions different from those of each other such as color or monochrome, ability/disability of recording to a hard disk (HDD), presence or absence of a facsimile function. To be exemplified referring to FIGS. 9 and 10, the present invention is applicable even to a system with those apparatuses exchanged with each other, that is, a system configured by the second image recording apparatus that is color image recording apparatus having a monochrome image recording function and the first image recording apparatus that is a monochrome image recording apparatus and, in this case, advantages such as that FCOT (First Copy Out Time: a time necessary for the apparatus to print an image on a sheet first and output to a containing portion as a recorded item) of the monochrome image recording apparatus becomes shorter can be expected. The present invention is surely applicable even to the case where the first image recording apparatus and the second image recording apparatus are completely of the same type.

Figure 2:
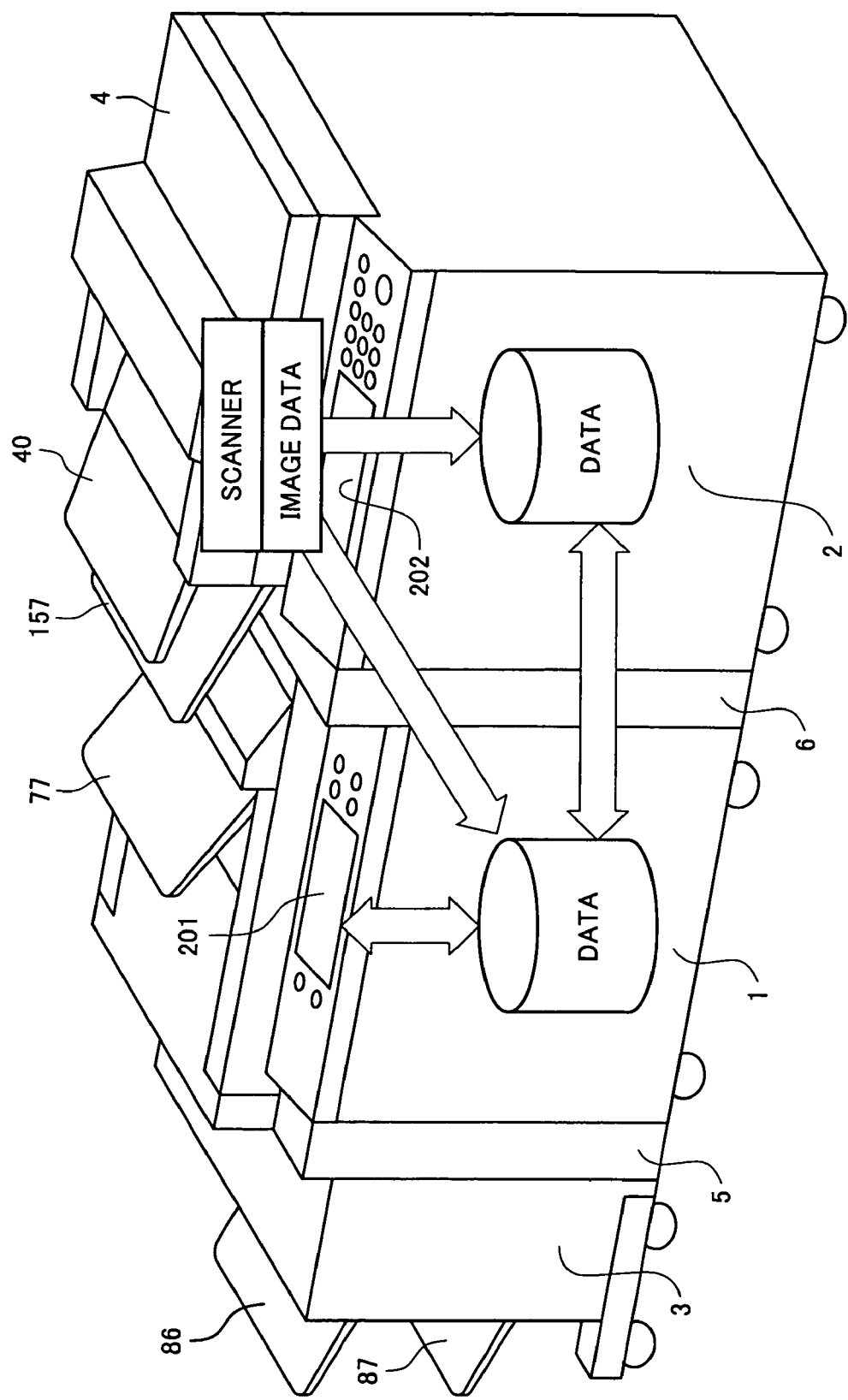
FIG. 2 is an explanatory schematic view of exchanging of image data in the image recording system of FIG. 1.
Figure 3:
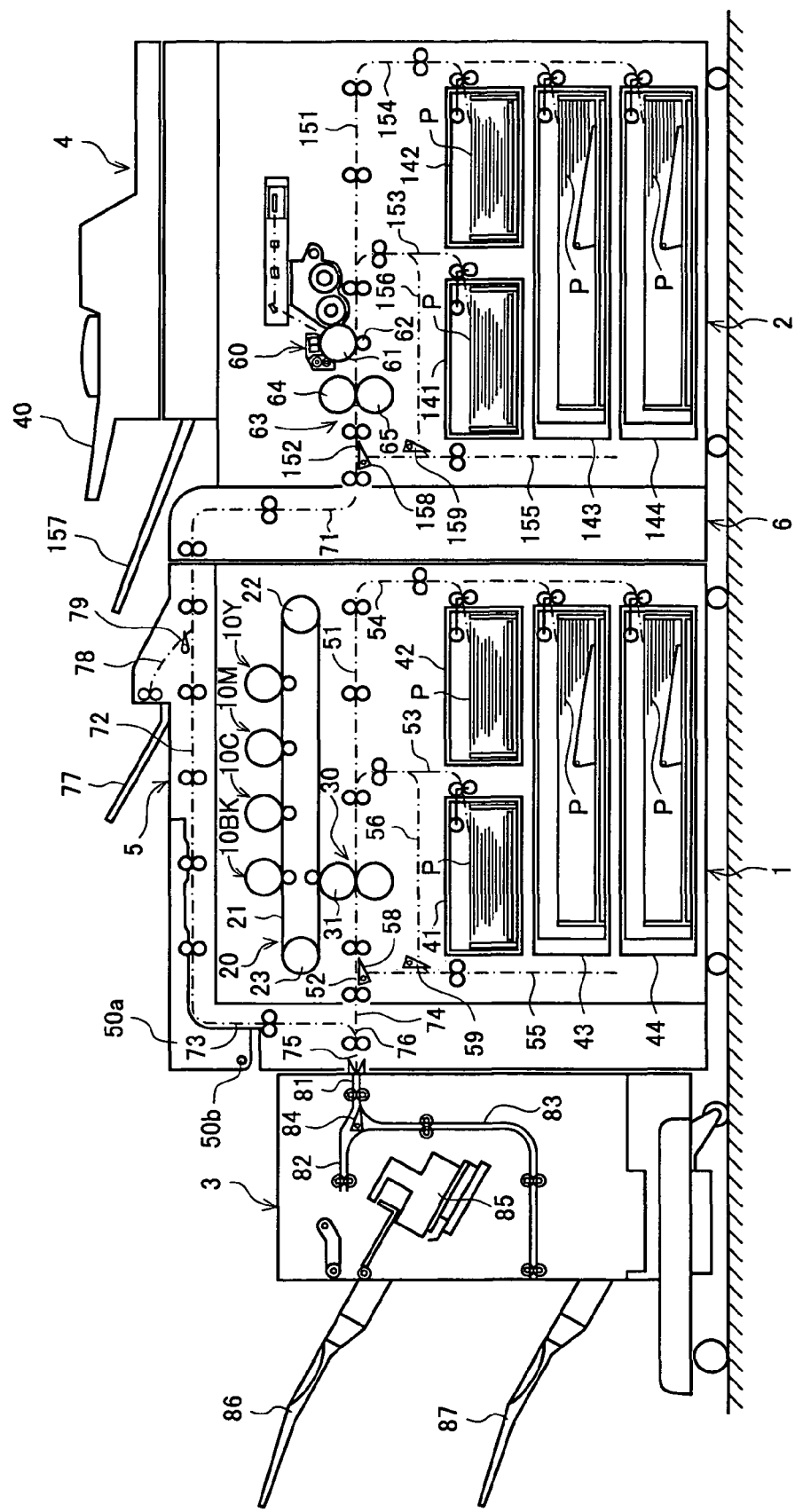
FIG. 3 is a schematic cross-sectional view of an example of the configuration of the image recording system of FIG. 1.
Figure 4:
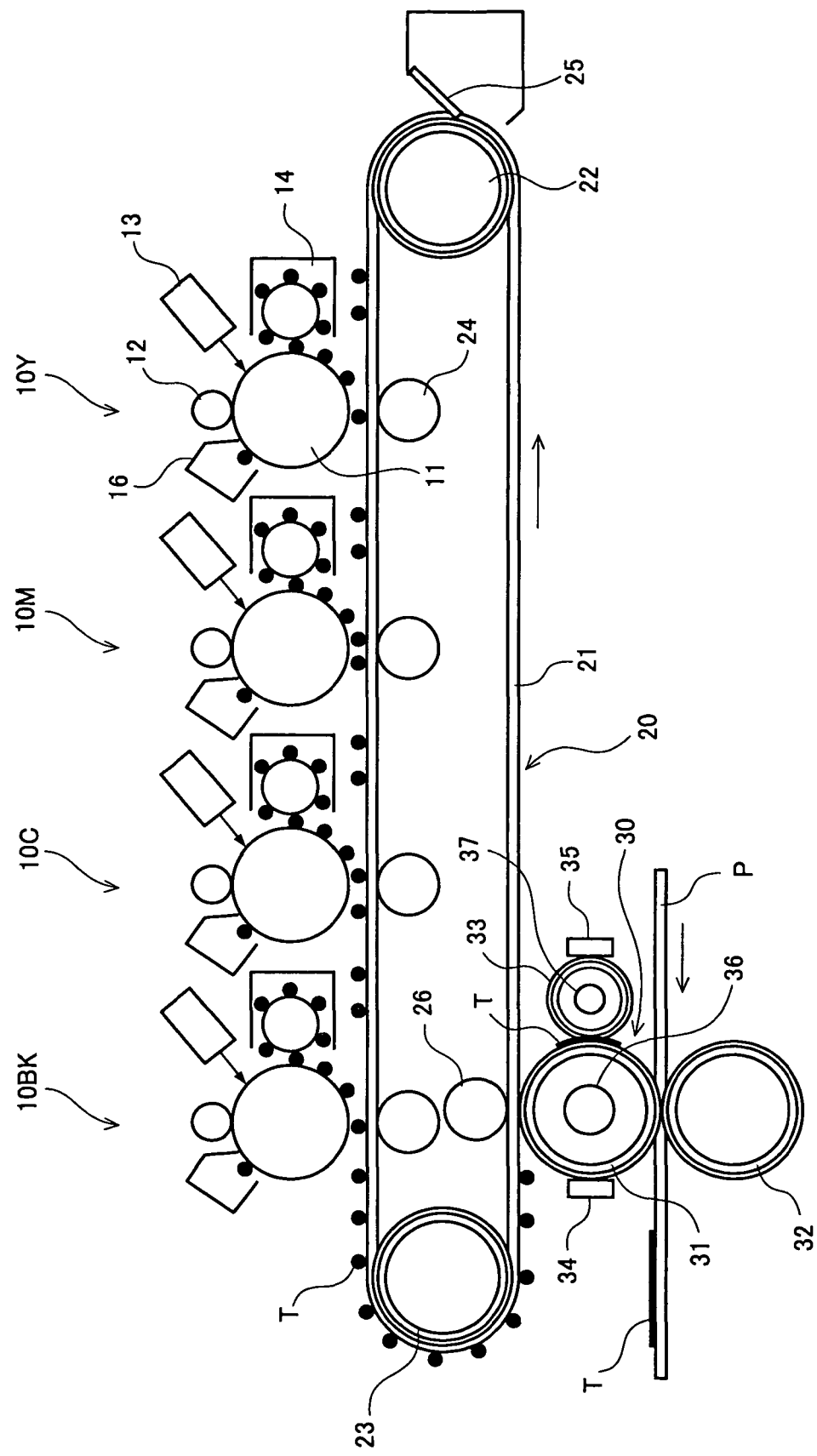
FIG. 4 is an enlarged view of a color image forming portion in the image recording system of FIG. 3.

FIG. 1 is a view of the appearance of the configuration of an image recording system according to an embodiment of the present invention. FIG. 2 is an explanatory schematic view of exchanging of image data in the image recording system of FIG. 1. FIG. 3 is a schematic cross-sectional view of an example of the configuration of the image recording system of FIG. 1. FIG. 4 is an enlarged view of a color image forming portion in the image recording system of FIG. 3.

The present system exemplified in FIGS. 1 to 4 comprises a color image recording apparatus 1 disposed on the center part, a final processing apparatus 3 disposed on the front side (on the left in the figure) of the color image recording apparatus 1, a monochrome image recording apparatus 2 disposed in the back side (on the right in the figure) of the color image recording apparatus 1, and a color image reading apparatus (color scanner) 4 mounted on the upper portion of the monochrome image recording apparatus 2.

The present system is exemplified assuming that the processing speed of the color image recording apparatus 1 used in the embodiment is about 70 sheets/min. and, in contrast, the processing speed of the monochrome image recording apparatus 2 is about 110 sheets/min. That is, for the color image recording apparatus 1 and the monochrome image recording apparatus 2 that are the two image recording apparatuses disposed fore and aft, the color image recording apparatus 1 having the slower processing speed is disposed in front and the monochrome image recording apparatus 2 having the faster processing speed is disposed in the back.

A bypass transporting path apparatus 5 having an inversed L-shape as a side view is disposed such that the apparatus 5 covers over the color image recording apparatus 1 from the front portion to the upper portion of the color image recording apparatus 1. A transporting path connecting apparatus 6 having a housing shape is disposed between the front portion of the monochrome image recording apparatus 2 and the back portion of the color image recording apparatus 1. An upper containing tray 77 is provided above the bypass transporting path apparatus 5. The front portion of the monochrome image recording apparatus 2 is connected with the back portion of the color image recording apparatus 1 through the transporting path connecting apparatus 6. The front portion of the monochrome image recording apparatus 2 is connected with the back portion of the final processing apparatus 3 through the bypass transporting path apparatus 5.

That is, as shown in FIG. 3, the present system exemplified herein is configured by connecting in series from the front to the back the final processing apparatus 3, the bypass transporting path apparatus 5, the color image recording apparatus 1, the transporting path connecting apparatus 6, and the monochrome image recording apparatus 2. The upper portion of the color image recording apparatus 1 is occupied by the bypass transporting path apparatus 5 having the upper containing tray 77. The upper portion of the monochrome image recording apparatus 2 has no bypass transporting path apparatus and is occupied by the color image reading apparatus (color scanner) 4.

As exemplified in FIG. 2, image data read by the color scanner 4 from an original document mounted on an original document mounting tray 40 and fed by automatic original document feeding or image data inputted from an external PC is stored temporarily in a data storing area in the color image recording apparatus 1 or the monochrome image recording apparatus 2, an image recording process is executed, and, when necessary, a substitute image recording process is executed. A monochrome-side operating panel 202 is disposed on the reader's side in the upper portion of the monochrome image recording apparatus 2 and a color-side operating panel 201 is disposed on the reader's side in the upper portion of the color image recording apparatus 1.

As to the embodiment, no more is described than that an ordinary color scanner is used as a color image reading apparatus 4 and description concerning the configuration of the color image reading apparatus 4 is omitted. Other configurations may be applicable such as that the color image reading apparatus 4 is provided on the color image recording apparatus 1 and a monochrome image reading apparatus is provided on the monochrome image recording apparatus 2.

The present system may also be configured by disposing the above color image recording apparatus 1 and monochrome image recording apparatus 2 side by side, providing a recorded item containing portion (or common containing portion) that contains commonly recording media that are recorded (recorded items) to each image recording apparatus, and providing a dedicated containing portion that contains dedicatedly recorded items of the monochrome image recording apparatus 2 (exemplified with the upper containing tray 77 provided above the bypass transporting path apparatus 5) to the above monochrome image recording apparatus 2 such that the dedicated containing portion and the above common containing portion are selectively used.

By configuring as above, the present system can be configured to contain the recorded items of the color image recording apparatus 1 and the recorded items of the monochrome image recording apparatus 2 together in the common containing portion during distributed processing that uses in parallel the color image recording apparatus 1 and the monochrome image recording apparatus 2. The present system can also be configured to contain the recorded items of the color image recording apparatus 1 in the common containing portion during color-apparatus-alone processing that uses singly the color image recording apparatus 1. The present system can also be configured to contain the recorded items of the monochrome image recording apparatus 2 in the dedicated containing portion during monochrome-apparatus-alone processing that uses singly the monochrome image recording apparatus 2. Thereby, parallel processing of two image recording jobs can be executed smoothly.

The configuration of each of the apparatuses will be described simply.

As shown in FIG. 3, the color image recording apparatus 1 comprises four image forming units 10BK, 10C, 10M, and 10Y, an intermediate transferring unit 20, a transfer fusing unit 30, a first recording paper sheet containing tray 41, a second recording paper sheet containing tray 42, a third recording paper sheet containing tray 43, a fourth recording paper sheet containing tray 44, a horizontal feed transporting path 51, a horizontal ejection transporting path 52, a first vertical transporting path 53, a second vertical transporting path 54, a third vertical transporting path 55, a horizontal return transporting path 56, and an ejection containing tray 77. The ejection containing tray 77 is a tray that contains recording paper sheets of monochrome images image-processed by the monochrome image recording apparatus 2 in the back (however, the sheets are usually contained in the common containing portion).

The color image recording apparatus 1 employs a tandem scheme as a method of recording a color image onto a recording paper sheet P that is a recording medium. The tandem scheme is a scheme of providing rotatably a semi-conductive endless belt, arranging a plurality of image forming portions that form visible images respectively of color tones that are different from each other in a line along a direction of move of the circumferential face of the endless belt, and forming one color image while the endless belt is rotating at least one time.

The above tandem scheme can be conventionally an intermediate transferring scheme of superimposing, on the circumferential face of the endless belt, the visible images respectively of the color tones formed respectively in the image forming portions and, thereafter, transferring the superimposed image onto a recording paper sheet P, and a transfer transporting scheme of transferring sequentially the visible images of the color tones formed respectively by the image forming portions onto the surface of a recording medium transported with being adsorbed on the circumferential face of the endless belt.

However, in the above tandem scheme, recently, a new scheme is employed that is different from the above intermediate transferring scheme or the transfer transporting scheme and the new scheme is employed also by the above color image recording apparatus 1. The new scheme of the tandem scheme comprises the four image forming units 10BK, 10C, 10M, and 10Y, the intermediate transferring unit 20, and the transfer fusing unit 30 in the components constituting the above color image recording apparatus 1. FIG. 4 exemplifies the configuration of the new scheme of the tandem scheme.

In FIG. 4, each of the image forming unit 10Y, 10M, 10C, and 10BK has a charging roller 12, a laser light illuminating portion 13, a developer 14, and a cleaner 16 disposed around a photo-sensitive drum 11. The developers of the units contain respectively toner T of colors of yellow (Y), magenta (M), cyan (C), and black (Bk).

The intermediate transferring unit 20 includes an intermediate transferring belt 21, an intermediate transferring belt driving roller 22, an intermediate transferring belt tension roller 23, primary transferring rollers 24 to electric-field-transfer the toner T from the photo-sensitive drums 11 onto the intermediate transferring belt 21 by providing an electric field between the photo-sensitive drums 11 and the intermediate transferring belt 21, an intermediate transferring belt cleaning unit 25 to clean out the toner T for transfer remaining on the intermediate transferring belt 21, and a secondary transferring backup roller 26 to transfer the toner T from the intermediate transferring belt 21 to a transfer fusing roller 31. Of these components, the intermediate transferring belt 21 is put around the intermediate transferring belt driving roller 22 and the intermediate transferring belt tension roller 23 and is rotationally driven by a driving portion not shown and the intermediate transferring belt driving roller 22 in the direction of an arrow.

The transfer fusing unit 30 includes the transfer fusing roller 31, a heating lamp 36 that is an internal heat source to heat the transfer fusing roller 31, a pressure roller 32, and a temperature detecting member 34. In addition to these components, a pressure heating roller 33 that pressurizes and heats, on the transfer fusing roller 31, the toner T that has been heated and melted on the transfer fusing roller 31, a heating lamp 37 that is a heat source to heat internally the pressure heating roller 33, a temperature detecting member 35 to detect the temperature of the pressure heating roller 33, etc., are provided. A recording paper sheet P is transported to a transfer fusing nip that is a contacting portion between the transfer fusing roller 31 and the pressure roller (pressurizing member) 32 by a paper sheet transporting member not shown.

The transfer fusing roller 31 used in the above transfer fusing unit 30 has the heating lamp 36 therein that is the heating source to heat and melt the toner T on the transfer fusing roller. The surface temperature of the transfer fusing roller 31 is controlled by heating at a specific temperature within a range of about 120° C. to 180° C. This temperature is set at the optimal temperature according to the type of toner material, the processing speed, the nip width and the loading condition of the transfer fusing nip that is the contacting portion between the transfer fusing roller 31 and the pressure roller 32, etc.

The feature of the above tandem-scheme color image recording apparatus employing the new scheme and having the above configuration is that a visible image is transferred from the photo-sensitive drums 11 onto the intermediate transferring belt 21 using the primary transferring rollers 24, the visible image transferred onto the intermediate transferring belt 21 is further transferred onto the transfer fusing roller 31, and, thereafter, the visible image transferred onto the transfer fusing roller 31 is transferred and fused onto the recording paper sheet P. That is, the above tandem scheme that is the new scheme does not need any fusing portion that has been used conventionally because the visible image is transferred and simultaneously fused onto the recording paper sheet P. Therefore, the apparatus has an advantage that the space for installing the fusing portion can be eliminated.

However, in the above tandem-scheme color image recording apparatus employing the new scheme, the transfer fusing roller 31 of the transfer fusing unit 30 heats and melts the toner T on the transfer fusing roller 31 as described above and, therefore, the surface temperature of the transfer fusing roller 31 is heated and controlled at a specific temperature within a range of about 120° C. to 180° C. The heated intermediate transferring belt 21 moves to the position of the image forming unit 10Y and the heat of the intermediate transferring belt 21 may give an adverse effect such as that the heat melts the toner T attached to the photo-sensitive drum 11 of the image forming unit 10Y.

To prevent the heat of the intermediate transferring belt 21 from giving the adverse effect to the image forming unit 10Y, the heat of the intermediate transferring belt 21 needs to be dissipated until the intermediate transferring belt 21 that has passed the transfer fusing roller 31 moves to the position of the image forming unit 10Y. Therefore, as shown in FIG. 4, according to the tandem scheme that is the above new scheme, the transfer fusing roller 31 of the transfer fusing unit 30 is disposed at a position with which the distance of the move of the belt from the transfer fusing roller 31 of the transfer fusing unit 30 to the image forming unit 10Y that is the closest unit to the roller 31 as to the intermediate transferring belt 21 is as long as possible.

That is, on the upper side of the intermediate transferring belt 21 put tensely around the intermediate transferring belt tension roller 23 disposed forward and the intermediate transferring belt driving roller 22 disposed backward, fore and aft, the image forming unit 10Y, the image forming unit 10M, the image forming unit 10C, and the image forming unit 10BK are disposed and, the transfer fusing unit 30 is disposed at a position somewhat anterior on the lower side of the intermediate transferring belt 21 with respect to the side on which the image forming units are disposed. Thereby, the distance of the move of the intermediate transferring belt 21 from the transfer fusing roller 31 to the image forming unit 10Y that is closest to the roller 31 is elongated to the maximum within a possible range in terms of the mechanism.

In the above color image recording apparatus 1, the configuration and disposition of the recording paper sheet containing tray that contains the recording paper sheets P are as follows. As described above, the intermediate transferring unit 20 is disposed being put tensely around the intermediate transferring belt tension roller 23 disposed forward and the intermediate transferring belt driving roller 22 disposed backward. However, the first recording paper sheet containing tray 41 and the second recording paper sheet containing tray 42 are disposed horizontally fore and aft under the intermediate transferring unit 20.

Between the first recording paper sheet containing tray 41 and the second recording paper sheet containing tray 42, and the intermediate transferring unit 20, the transfer fusing unit 30 that corresponds to the above image transferring portion is disposed in a somewhat anterior position, that is, above the first recording paper sheet containing tray 41. Under the first recording paper sheet containing tray 41 and the second recording paper sheet containing tray 42, the third recording paper sheet containing tray 43 is disposed and, under the third recording paper sheet containing tray 43, the fourth recording paper sheet containing tray 44 is disposed.

In those trays, the first recording paper sheet containing tray 41 and the second recording paper sheet containing tray 42 have the same configuration and the same size, and the third recording paper sheet containing tray 43 and the fourth recording paper sheet containing tray 44 have the same configuration and the same size. The longitudinal lengths of the third recording paper sheet containing tray 43 and the fourth recording paper sheet containing tray 44 is substantially same as the length from the front end of the first recording medium containing portion to the back end of the second recording medium containing portion. The widths of the above recording paper sheet containing trays 41, 42, 43, and 44 are all same. Each of the above recording paper sheet containing trays 41, 42, 43, and 44 is able to be attached to and detached from the interior of the color image recording apparatus 1 through the side (the face closer to the reader in FIG. 4) of the color image recording apparatus 1.

Each of the first recording paper sheet containing tray 41 and the second recording paper sheet containing tray 42 is a recording paper sheet containing tray that contains the recording paper sheets P having the size of A4 or smaller and each of the third recording paper sheet containing tray 43 and the fourth recording paper sheet containing tray 44 is a recording paper sheet containing tray that contains the recording paper sheets P having the size of A3 at largest. Each of the above recording paper sheet containing trays 41, 42, 43, and 44 is provided with a recording paper sheet detecting sensor that detects presence/absence of the recording paper sheets P contained therein.

At the upper ends in the back portions of the above first recording paper sheet containing tray 41, the second recording paper sheet containing tray 42, the third recording paper sheet containing tray 43, and the fourth recording paper sheet containing tray 44, a first transporting gate path, a second transporting gate path, a third transporting gate path, and a fourth transporting gate path are respectively provided as transporting gate paths to transport the recording paper sheets P from inside the tray to outside the trays. Each of the transporting gate paths is provided with a roller for transporting the recording paper sheets and, when the recording paper sheets P are transported out of each of the paper sheet containing trays, the rollers for transporting the recording paper sheets are driven by driving portions not shown and the recording paper sheets P are transported out.

In the above color image recording apparatus 1, a transporting path to transport the recording paper sheets P is configured as follows. That is, recording of characters and figures onto the recording paper sheets P is executed by the transfer fusing nip formed by the contact of the transfer fusing roller 31 and the pressure roller 32 of the transfer fusing unit 30 and, therefore, the recording paper sheet P needs to be transported to the transfer fusing nip. Therefore, the horizontal feed transporting path 51 that transports and feeds the recording paper sheet P to the transfer fusing nip is formed such that the path 51 extends horizontally from the transfer fusing nip of the transfer fusing unit 30 to the back. The horizontal ejection transporting path 52 that transports and ejects the recording paper sheet P from the transfer fusing nip is formed such that the path 52 extends horizontally from the transfer fusing nip of the transfer fusing unit 30 to the front. The horizontal ejection transporting path 52 is connected with the front portion of the bypass transporting path apparatus 5 described later, and is connected with the final processing apparatus 3 described later through this portion.

The first vertical transporting path 53 is formed upward from a position between the first recording paper sheet containing tray 41 and the second recording paper sheet containing tray 42 and the upper end of the first vertical transporting path 53 is connected with the middle portion of the horizontal feed transporting path 51. The second vertical transporting path 54 is formed upward from the back of the second recording paper sheet containing tray 42 and the upper end of the second vertical transporting path 54 is connected with the back end of the horizontal feed transporting path 51. As described later, these transporting paths are used to respectively feed the recording paper sheets P from the recording paper sheet containing trays 41, 42, 43, and 44 to the transfer fusing unit 30 and to eject the recording paper sheets P that are fed.

Therefore, the above first vertical transporting path 53 is connected with the first transporting gate path of the first recording paper sheet containing tray 41, and the second vertical transporting path 54 is connected with the second transporting gate path of the second recording paper sheet containing tray 42, the third transporting gate path of the third recording paper sheet containing tray 43, and the fourth transporting gate path of the fourth recording paper sheet containing tray 44.

The third vertical transporting path 55 is branched from the horizontal feed transporting path 51 and directed downward, and formed in front of the first recording paper sheet containing tray 41 and the third recording paper sheet containing tray 43. The portion of the branching of the third vertical transporting path 55 from the horizontal feed transporting path 51 is provided with a transporting path switching lever 58. The horizontal return transporting path 56 is formed between the first recording paper sheet containing tray 41 and the transfer fusing unit 30, horizontally extending backward and branching from the upper portion of the above third vertical transporting path 55. The backend of the horizontal return transporting path 56 is connected with the middle portion of the first vertical transporting path 53. The portion of the branching of the horizontal return transporting path 56 from the third vertical transporting path 55 is provided with a transporting path switching lever 59. The third vertical transporting path 55 and the horizontal return transporting path 56 are provided to enable the recording of characters, figures, etc., onto both sides of the recording paper sheets P.

The above horizontal feed transporting path 51, the horizontal ejection transporting path 52, the first vertical transporting path 53, the second vertical transporting path 54, the third vertical transporting path 55, and the horizontal return transporting path 56 are provided with rollers and guides (not shown) driven by a driving portion not shown and these rollers and guides transport the recording paper sheets P.

The monochrome image recording apparatus 2 will be described. The monochrome image recording apparatus 2 records monochrome characters, figures, etc., onto the recording paper sheets P. In FIG. 3, the monochrome image recording apparatus 2 comprises a monochrome image forming unit 60, a fusing unit 63, a first recording paper sheet containing tray 141, a second recording paper sheet containing tray 142, a third recording paper sheet containing tray 143, a fourth recording paper sheet containing tray 144, a horizontal feed transporting path 151, a horizontal ejection transporting path 152, a first vertical transporting path 153, a second vertical transporting path 154, a third vertical transporting path 155, a horizontal return transporting path 156, and an ejection containing tray 157 that contains the recording paper sheets of monochrome images that have been image-processed.

Different from the above color image recording apparatus 1, in the above monochrome image recording apparatus 2, the monochrome image forming unit 60 does not include any fusing function and, separately, the fusing unit 63 comprising a fusing roller 64 and a pressure roller 65 is present independently. The above monochrome image forming unit 60 is provided with a portion comprising a photo-sensitive drum 61 and a pressure roller 62 and corresponding to the above image transferring portion, and a monochrome image formed on the surface of the photo-sensitive drum 61 is transferred onto the recording paper sheet P.

The above monochrome image recording apparatus 2 can be configured by replacing the transfer fusing unit 30 in the above color image recording apparatus 1 with the photo-sensitive drum 61 and the pressure roller 62. That is, the configuration and the disposition of recording paper sheet containing trays that contain the recording paper sheets P and transporting paths that transport the recording paper sheets P in the above monochrome image recording apparatus 2 are completely same as those of the recording paper sheet containing trays and the transporting paths of the above color image recording apparatus 1. Therefore, description for these is omitted. However, different from the color image recording apparatus 1, the horizontal ejection transporting path 152 of the monochrome image recording apparatus 2 is connected with the back end of the bypass transporting path apparatus 5 described later and is connected with the final processing apparatus 3 described later through the bypass transporting path apparatus 5. In FIG. 3, the parts concerning the recording paper sheet containing trays that contain the recording paper sheets P and the transporting paths that transport the recording paper sheets P in the monochrome image recording apparatus 2 are denoted by numerals in 100s and the lower two digits of these numerals are same as the numerals of the corresponding parts in the color image recording apparatus 1.

The transporting path connecting apparatus 6 will be described. The transporting path connecting apparatus 6 is used attached to the front portion of the monochrome image recording apparatus 2 and has a function of transporting the recording paper sheets P transported by the horizontal ejection transporting path 152 of the monochrome image recording apparatus 2 to the back end of the bypass transporting path apparatus 5 attached to the color image recording apparatus 1.

Therefore, the transporting path connecting apparatus 6 is provided with a bypass ascending transporting path 71. The back end of the bypass ascending transporting path 71 is connected with the front end of the horizontal ejection transporting path 152 of the monochrome image recording apparatus 2. The bypass ascending transporting path 71 has the back end thereof forming a horizontal transporting path and this path bends upward in an ark shape from the back end to the middle portion of the path. The middle portion of the path forms a vertical transporting path and this path bends forward in an arc shape from the middle portion to the front end. The front end forms a horizontal transporting path. The above bypass ascending transporting path 71 is provided with rollers and guides (not shown) driven by a driving portion not shown.

In the above transporting path connecting apparatus 6, the recording paper sheet P delivered from the horizontal ejection transporting path 152 of the monochrome image recording apparatus 2 is transported forward horizontally over a small distance by the back end of the bypass ascending transporting path 71, thereafter, transported upward from a lower position by the middle portion of the bypass ascending transporting path 71, and transported further forward horizontally over a small distance by the front end of the bypass ascending transporting path 71.

The bypass transporting path apparatus 5 will be described. The bypass transporting path apparatus 5 is attached to the color image recording apparatus 1 with covering thereover from the front portion to the upper portion of the color image recording apparatus 1. The bypass transporting path apparatus 5 transports the recording paper sheet P delivered from the bypass ascending transporting path 71 of the transporting path connecting apparatus 6 to the final processing apparatus 3. The bypass transporting path apparatus 5 also transports the recoding paper sheet P ejected and delivered from the horizontal ejection transporting path 52 of the color image recording apparatus 1 to the final processing apparatus 3.

Therefore, the bypass transporting path apparatus 5 is provided with a bypass horizontal transporting path 72, a bypass descending transporting path 73, a rear main transporting path 74, and a front main transporting path 75. The back end of the bypass horizontal transporting path 72 is connected with the front end of the bypass ascending transporting path 71 of the transporting path connecting apparatus 6. The front end of the bypass horizontal transporting path 72 is connected with the upper end of the bypass descending transporting path 73. The lower end of the bypass descending transporting path 73 joins and is connected with a main transporting path joining middle portion 76 that is a connecting portion of the rear main transporting path 74 and the front main transporting path 75. The rear end of the front main transporting path 75 is connected with the front end of the horizontal ejection transporting path 52 of the color image recording apparatus 1. Each of the above bypass horizontal transporting path 72, the bypass descending transporting path 73, the rear main transporting path 74, and the front main transporting path 75 is provided with rollers and guides (not shown) driven by a driving portion not shown.

The upper face portion of the housing of the bypass transporting path apparatus 5, a portion of the bypass horizontal transporting path 72 of the bypass transporting path apparatus 5, and a portion of the bypass descending transporting path 73 are configured integrally and form a bypass transporting path releasing portion 50a. The bypass transporting path releasing portion 50a can be opened and closed with a supporting point 50b as the center provided at the lower end of the front end of the bypass transporting path releasing portion 50a. Therefore, disposition for jamming of the recording paper sheet P occurred in the bypass horizontal transporting path 72 or the bypass descending transporting path 73 and maintenance can be easily executed.

In the above bypass transporting path apparatus 5, the recording paper sheet P delivered by the bypass ascending transporting path 71 of the transporting path connecting apparatus 6 to the bypass horizontal transporting path 72 is transported forward horizontally by the bypass horizontal transporting path 72, is transported vertically downward by the bypass descending transporting path 73, is delivered to the front main transporting path 75 in the main transporting path joining middle portion 76, is transported forward horizontally by the front main transporting path 75, and is delivered to the final processing apparatus 3. While, the recording paper sheet P delivered from the horizontal ejection transporting path 52 of the color image recording apparatus 1 to the rear main transporting path 74 is also transported forward horizontally by the front main transporting path 75 and is delivered to the final processing apparatus 3.

In this case, the recording paper sheet P delivered from the transporting path connecting apparatus 6 and the recording paper sheet P delivered from the color image recording apparatus 1 may compete and collide with each other in the main transporting path joining middle portion 76. To avoid this collision, temporary detention control for the recording paper sheet P in the bypass horizontal transporting path 72 may be adapted to be executed to the bypass transporting path apparatus 5.

An upper containing transporting path 78 and an upper containing tray 77 are provided above the bypass transporting path 5 described above. The upper containing transporting path 78 is provided such that the path 78 branches from the bypass horizontal transporting path 72. The path 78 receives, by the switching of a transporting path switching lever 79, the recording paper sheet P transported by the bypass horizontal transporting path 72, transports the sheet P, and the sheet P is contained in the upper containing tray 77. The upper containing tray 77 is provided as a recording paper sheet containing tray dedicated to the monochrome image recording apparatus 2 to enable the recording paper sheet P recorded in the monochrome image recording apparatus 2 to be received and contained on the way to the final processing apparatus 3 without transporting the sheet P thereto.

The final processing apparatus 3 will be described. The final processing apparatus 3 is an apparatus that contains the recording paper sheet P recorded with an image by the color image recording apparatus 1 or the monochrome image recording apparatus 2. For the sheet P to be contained as above, the apparatus 3 has a function of containing a plurality of recording paper sheets P in order of the sheets P as transported, and binding and making a book with the plurality of recording paper sheets P contained.

Therefore, the final processing apparatus 3 includes a first containing horizontal transporting path 81, a second containing horizontal transporting path 82, a third containing transporting path 83, a transporting path switching lever 84, a finisher portion 85, a first containing tray 86, and a second containing tray 87. In these components, the first containing horizontal transporting path 81, the second containing horizontal transporting path 82, and the third containing transporting path 83 are used to transport the recording paper sheet P delivered from the front main transporting path 75 of the bypass transporting path apparatus 5 to the finisher portion 85 or the second containing tray 87.

The back end of the first containing horizontal transporting path 81 is connected with the front end of the front main transporting path 75 of the bypass transporting path apparatus 5. The front end of the first containing horizontal transporting path 81 is connected with the back end of the second containing horizontal transporting path 82 and the upper end of the third containing transporting path 83. This connecting portion is provided with the transporting path switching lever 84. Whether the recording paper sheet P transported by the first containing horizontal transporting path 81 that has a small transporting distance is transported to the second containing horizontal transporting path 82 or the third containing transporting path 83 is switched by the transporting path switching lever 84. The third containing transporting path 83 forms a vertical transporting path heading downward from the upper end and forms a horizontal transporting path after bending in an arch shape toward substantially the front on the way. The above first containing horizontal transporting path 81, second containing horizontal transporting path 82, and third containing transporting path 83 are provided with rollers and guides (not shown) driven by a driving portion not shown.

The finisher portion 85 is disposed under the front end of the second containing horizontal transporting path 82. The finisher portion 85 stocks the recording paper sheets P transported by the second containing horizontal transporting path 82 sequentially, binds and make books with, etc., the sheets P, and sends the sheets P to the first containing tray 86. The recording paper sheets P transported by the third containing transporting path 83 are contained in the second containing tray 87 in order of the sheets P as transported. As above, the final processing apparatus 3 corresponds to the common recorded item containing portion described above. Therefore, the above recorded item containing portion can be the first containing tray 86 that can make books and the second containing tray 87 that simply contains the sheets P in order of the sheets P as transported.

Figure 5:
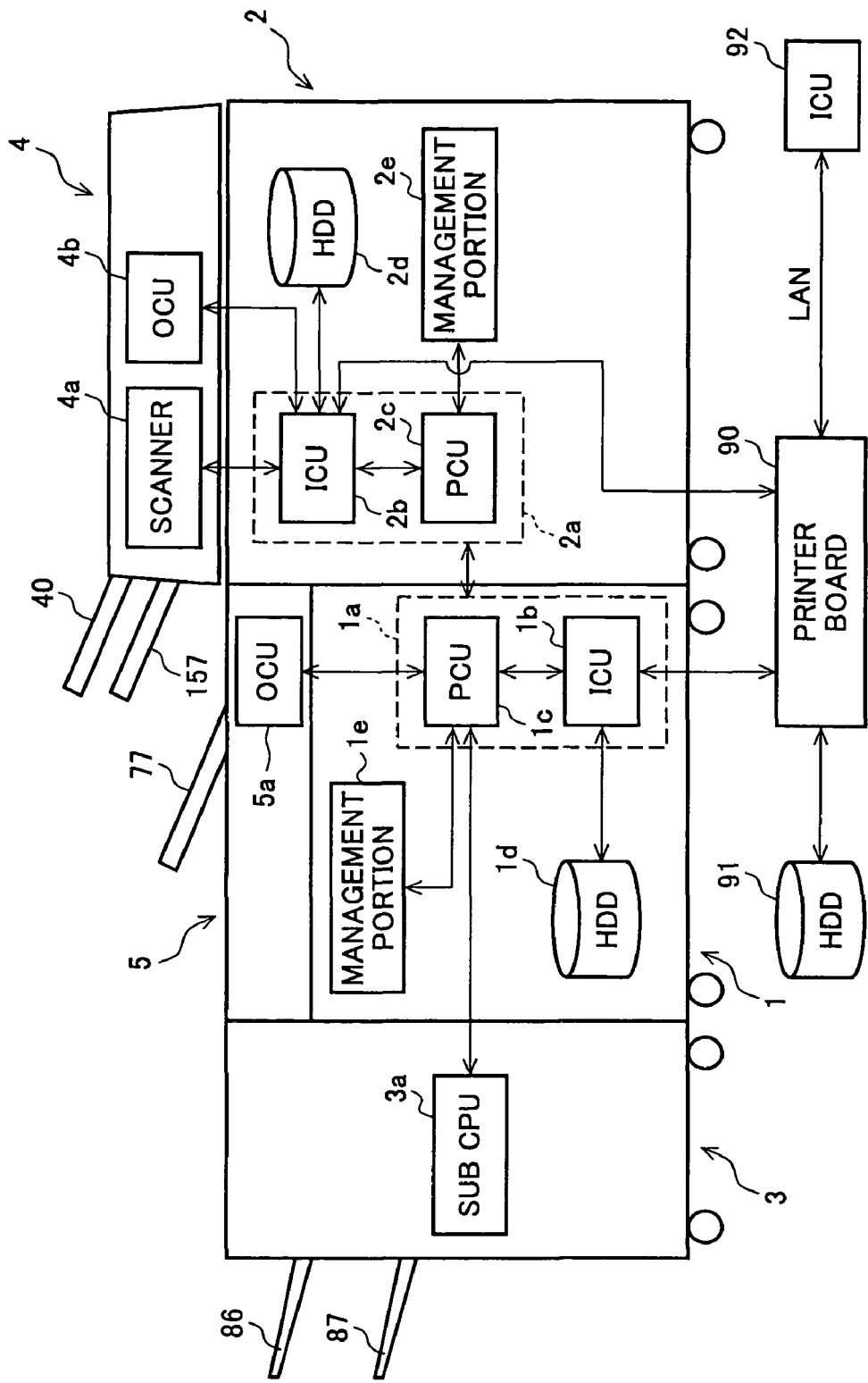
FIG. 5 is a block diagram of the main part that executes image recording control in the image recording system of FIG. 1.

The example of the configuration of the present system has been described referring to FIGS. 1 to 4, and the control of the present system will be described referring to FIG. 5. FIG. 5 is a block diagram of an example of the main part that executes image recording control in the image recording system of FIG. 1. In FIG. 5, though the transporting path connecting apparatus 6 is not shown, the apparatus 6 is provided between the monochrome image recording apparatus 2 and the color image recording apparatus 1 as shown in FIGS. 1 to 4.

The color image recording apparatus 1, the monochrome image recording apparatus 2, and the final processing apparatus 3 respectively have a color-side controlling portion, a monochrome-side controlling portion, and a final-processing-side controlling portion. Of these components, the color-side controlling portion includes a controlling function for the bypass transporting path apparatus 5 and the monochrome-side controlling portion includes a controlling function for the color image reading apparatus 4 and the transporting path connecting apparatus 6.

In addition, the color-side controlling portion also includes, in a main controlling portion 1a, power supply controlling functions (described later) that are necessary as the present system. However, as described later, these controlling functions necessary as the present system may be provided to the monochrome-side controlling portion and may be provided to both of the monochrome-side controlling portion and the color-side controlling portion. As the intermediate form of the above two, a controlling portion may be provided in the bypass transporting path apparatus 5 or the transporting path connecting apparatus 6.

The color-side controlling portion includes a color-side ICU (Image Controlling Unit) 1b and a color-side PCU (Print Controlling Unit) 1c as the color-side main controlling portion 1a, and comprises the color-side main controlling portion 1a, a color-side OCU (Operator Controlling Unit) 5a having a color-side operating panel 201 (see FIGS. 1 and 2), a color-side HDD 1d, and a color-side management portion 1e.

The color-side ICU 1b executes processes concerning color image data processed in the color image recording apparatus 1. When the color image recording apparatus 1 is used as an independent single apparatus and, when a color scanner, etc., is installed also in the upper portion of the color image recording apparatus 1, the color-side ICU 1b executes processes concerning the color scanner, etc. The color-side HDD 1d stores temporarily image data read by the color image reading apparatus 4. The color-side PCU 1c controls the above color image recording apparatus 1. The color-side OCU 5a is a part that is operated by a user (operator) that operates the color image recording apparatus 1, and includes the color-side operating panel 201 (see FIGS. 1 and 2) disposed with a touch panel on a liquid crystal display. The color-side management portion 1e is a memory that stores management information for managing the processes that the color image recording apparatus 1 executes. The color-side PCU 1c refers to the management information stored by the color-side management portion 1e and controls the color image recording apparatus 1 based on the referred information.

The monochrome-side controlling portion includes a monochrome-side ICU 2b and a monochrome-side PCU 2c as a monochrome-side main controlling portion 2a, and comprises the monochrome-side main controlling portion 2a, a monochrome-side OCU 4b having a monochrome-side operating panel 202 (see FIGS. 1 and 2), a monochrome-side HDD 2d, and a monochrome-side management portion 2e.

The monochrome-side ICU 2b basically executes processes concerning monochrome image data processed in the monochrome image recording apparatus 2. However, when the color image reading apparatus 4 is installed in the upper portion of the monochrome image recording apparatus 2 as the present system, the ICU 2b executes control concerning a color scanner 4a including processes of color image data read by the color scanner 4a in the color image reading apparatus 4. The monochrome-side HDD 2d stores temporarily the above image data. The monochrome-side PCU 2c controls the above monochrome image recording apparatus 2. The monochrome-side OCU 4b is a part that is operated by the operator that operates the monochrome image recording apparatus 2, and includes the monochrome-side operating panel 202 (see FIGS. 1 and 2) disposed with a touch panel on a liquid crystal display. The monochrome-side management portion 2e is a memory that stores management information for managing processes executed by the monochrome image recording apparatus 2. The monochrome-side PCU 2c refers to the management information stored by the monochrome-side management portion 2e and controls the monochrome image recording apparatus 2 based on the referred information.

A final-processing-side controlling portion 3a comprises a SUB CPU (Sub-Central Processing Unit) 3a. The SUB CPU 3a controls the final processing apparatus 3. However, the final-processing-side controlling portion does not need to include any OCU. Information from the color-side OCU 5a of the color-side controlling portion or the monochrome-side OCU 4b of the monochrome-side controlling portion may be used as the information concerning operation instructions to the final processing apparatus 3.

In addition, the present system also includes a printer board 90 and an HDD 91 as parts concerning the control thereof. The printer board 90 is connected with the color-side ICU 1b and the monochrome-side ICU 2b. The printer board 90 is connected with a LAN installed outside the present system and is connected with an ICU 92 of another LAN-connected image recording apparatus or a PC through the LAN. The printer board 90 receives image data transmitted from a PC, etc., to the present system through a LAN and transmits the received data to the color-side ICU 1b or the monochrome-side ICU 2b. The HDD 91 stores temporarily the image data.

For the control of the present system, the color-side PCU 1c that controls the color image recording apparatus 1 and the monochrome-side PCU 2c that controls the monochrome image recording apparatus 2 are interconnected and are adapted to be able to exchange necessary information with each other. The color image reading apparatus 4 is connected with both of the monochrome-side ICU 2b and the color-side ICU 1b and is adapted to store all the image data read by the color scanner 4a in the color-side HDD 1d. The present system provides a function of controlling the entire system to the color-side PCU 1c. Therefore, the color-side PCU 1c issues instructions to the monochrome-side PCU 2c and the sub CPU 3a of the final-processing-side controlling portion 3a such that the present system operates the process most efficiently.

The above color-side OCU 5a and the above monochrome-side OCU 4b are respectively independent OCUs as the color-side OCU 5a originally issues only instructions to the color image recording apparatus 1 and, similarly, the monochrome-side OCU 4b originally issues only instructions to the monochrome image recording apparatus 2. For example, the type of the recording paper sheets P contained in the color image recording apparatus 1 and the monochrome image recording apparatus 2, and information of corresponding recording paper sheet containing trays, etc., containing the recording paper sheets P, are respectively inputted separately from the color-side OCU 5*a* and the monochrome-side OCU 4*b*.

However, in the control of the present system, the color-side OCU 5*a* and the monochrome-side OCU 4*b* divide the roles between each other to improve the efficiency of the present system. That is, the monochrome-side operating panel 202 (see FIGS. 1 and 2) of the monochrome image recording apparatus 2 installed with the color image reading apparatus 4 issues instructions on inputting, processing, etc., of the image data concerning the color image reading apparatus 4, the monochrome image recording apparatus 2, the color image recording apparatus 1, and the final processing apparatus 3. The color-side operating panel 201 on the color image recording apparatus 1 is adapted to display the operating states of the monochrome image recording apparatus 2 and the color image recording apparatus 1 and instructions, etc., of checks and processing of image data already inputted. Due to this dividing of the roles, the color-side operating panel 201 provided to the color image recording apparatus 1 and the monochrome-side operating panel 202 provided to the monochrome image recording apparatus 2 respectively have configurations that are different from each other (see FIGS. 1 and 2).

Description will be made of the power supply controlling function necessary for the image recording system of the present invention, which is included in the main controlling portion 1*a* of the color-side controlling portion. That is, in this description, the color-side main controlling portion 1*a* of the color image recording apparatus 1 acts as the above power supply controlling portion, or the power supply controlling portion and the operational state monitoring portion, to control the monochrome-side main controlling portion 2*a* of the monochrome image recording apparatus 2.

The operational state monitoring portion monitors the operational states of the color image recording apparatus 1 and the monochrome image recording apparatus 2 to monitor whether each image recording apparatus is in a recordable waiting state, a state of executing a process after accepting a print job, a power saving state after shifting to an energy saving mode, or a stop state after power-off, for example. The power supply controlling portion performs control based on the operational state of each image recording apparatus from the operational state monitoring portion to shift any one image recording apparatus to the power saving state and to make the other image recording apparatus wait in a recordable state.

Since the color image recording apparatus 1 includes a monochrome image recording function, can support both the color and monochrome operation, and generally includes a wider variety of recording modes as compared to the monochrome image recording apparatus 2, it is desirable to shift the monochrome image recording apparatus 2 to the power saving state first and to make the color image recording apparatus 1 wait in the recordable state.

The operational state monitoring portion includes a timer function to determine whether a predetermined time has elapsed while two image recording apparatuses are waiting in a recordable state. That is, if a print job is not input for a predetermined time period after the wait state starts, the power supply controlling portion is notified. When notified by the operational state monitoring portion, the power supply controlling portion shifts the monochrome image recording apparatus 2 to the power saving state and makes the color image recording apparatus 1 wait in the recordable state. By putting the color image recording apparatus 1 in the wait state, the system can quickly respond to any print job of color and monochrome print jobs while saving energy.

When consumables necessary for recording an image in any one image recording apparatus of two image recording apparatuses run out, the power supply controlling portion may shift the image recording apparatus to the power saving state and make the other image recording apparatus wait in the recordable state. The consumables are, for example, recording sheets and toner and, for example, if the color-side main controlling portion 1*a* is set such that the monochrome image recording apparatus 2 is preferentially used, since the consumables run out first on the monochrome side, the monochrome image recording apparatus 2 shifts to the power saving state first, and the color image recording apparatus 1 remains in the wait state.

The color-side main controlling portion 1*a* may include a function of counting the remaining amount of consumables of each image recording apparatus. In this case, it is attempted to use all the consumables first in one of two image recording apparatuses where the counted amount of the remaining consumables is less than a predetermined amount. For example, if the remaining amount of the consumables in the monochrome image recording apparatus 2 becomes less than a predetermined amount earlier than the remaining amount of the consumables in the color image recording apparatus 1, since the consumables run out first on the monochrome side, the monochrome image recording apparatus 2 shifts to the power saving state first, and the color image recording apparatus 1 remains in the wait state.

The color-side main controlling portion 1*a* may include a function of selecting the image recording apparatus allowed to perform a recording process depending on a type (color or monochrome) of a print job accepted by the system. If the selected image recording apparatus is in the power saving state, the power supply controlling portion controls and returns the image recording apparatus to the recordable state.

Each portion can be realized by incorporating in an executable manner into the color-side main controlling portion 1*a* of the color image recording apparatus 1 a program for allowing a computer including a CPU in the main controlling portion 1*a*, a RAM (Random Access Memory) that is a work area, a ROM (Read Only Memory), etc., to function as the power supply controlling portion, or the power supply controlling portion and the operational state monitoring portion. Incorporating in an executable manner means to incorporate a program into the ROM (or rewritable ROM) such that the program is read out onto the RAM and executed by the CPU.

For the color image recording apparatus 1 and the monochrome image recording apparatus 2, the order of shifting to the power saving state may be stored in the color-side management portion 1*e* and/or the monochrome-side management portion 2*e* and may be read from the color-side PCU 1*c* and/or the monochrome-side PCU 2*c*. In this case, the power supply controlling portion determines the image recording apparatus shifted to the power saving state in accordance with the order of shifting to the power saving state, which is read from the color-side management portion 1*e* and/or the monochrome-side management portion 2*e*.

Description will be made of a preferred form of the power supply control in each portion, which is a principal feature of the present invention.

The present system includes the above power supply controlling portion, which is a principal feature of the present invention. The power supply controlling portion in the example shown in FIGS. 1 to 4 performs control based on the operational states of two image recording apparatuses to shift any one image recording apparatus to the power saving state and to make the other image recording apparatus wait in the recordable state.

Figure 6:
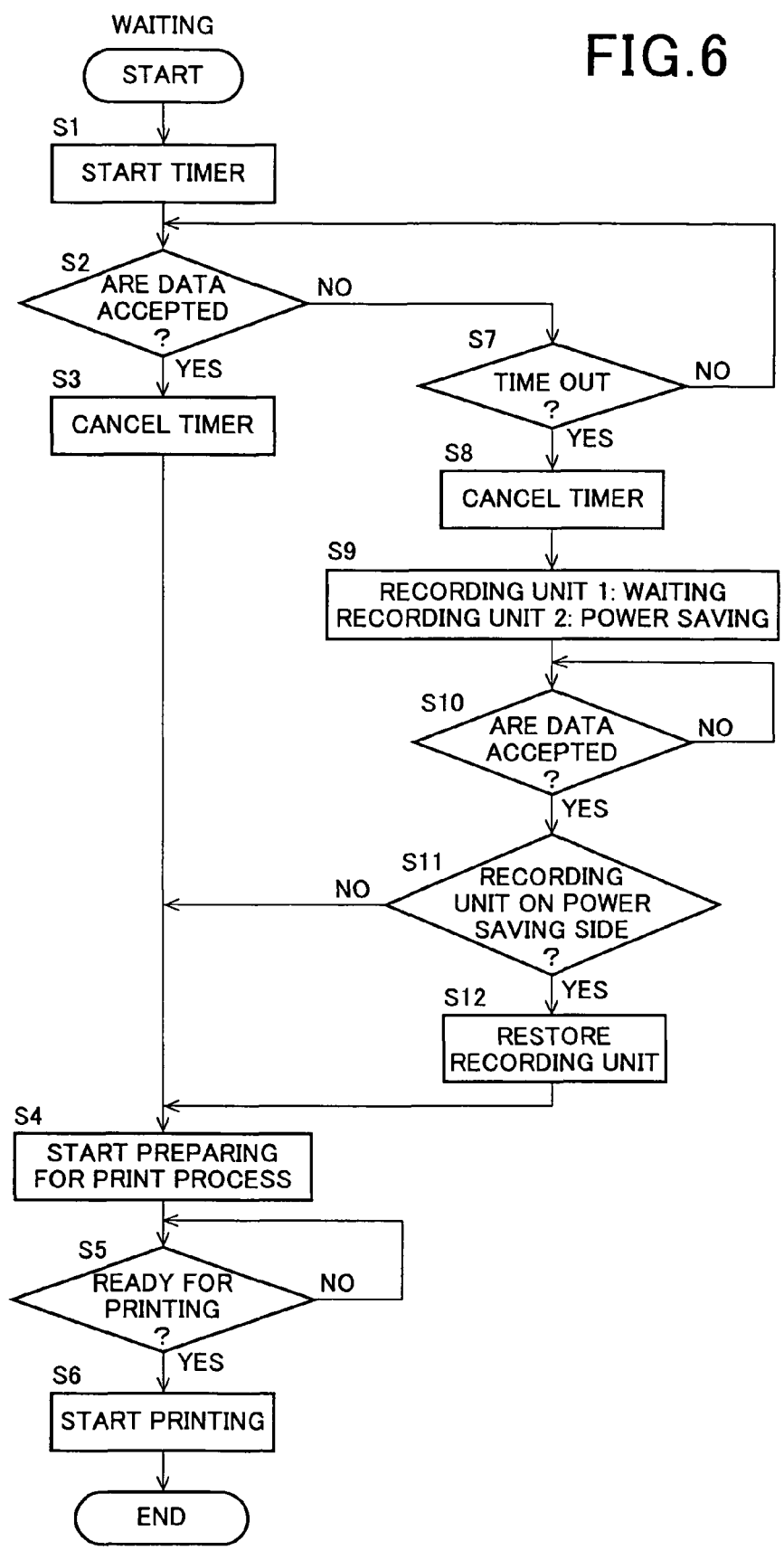
FIG. 6 is an explanatory flowchart of an example of a power supply con-trolling process in the image recording system described in FIGS. 1 to 5.

FIG. 6 is an explanatory flowchart of an example of a power supply control process in the image recording system described in FIGS. 1 to 5. The power supply control process (process of entering/returning into/from the energy saving mode) in the power supply controlling portion will be described with reference to FIG. 6. In this description, it is assumed that the color-side main controlling portion 1a includes the power supply control function necessary for the image recording system according to the present invention.

The present system (color-side main controlling portion 1a) starts a timer when entering into an input wait state for a print job (step S1) and determines whether data (print job) are accepted (step S2) and, if the data are accepted within a preset time (in the case of YES), the system cancels the timer (step S3) and starts preparing for a print process of any one or both of the image recording apparatuses (step S4).

The system determines whether the image recording apparatus to be used is ready for the printing (step S5) and if the apparatus is ready for the printing (in the case of YES), the system starts the print process for the accepted data (step S6). If not ready for the printing (in the case of NO) at step S5, the process of step S5 is repeated.

On the other hand, if the data (print job) is not accepted at step S2 (in the case of NO), the system determines whether the preset time is over (step S7) and, if the time is over (in the case of YES), the system cancels the timer (step S8), shifts the monochrome image recording apparatus 2 corresponding to the recording portion 2 to the power saving state, and makes the color image recording apparatus 1 corresponding to the recording portion 1 wait in the recordable state in this example (step S9). If the time is not over at step S7 (in the case of NO), the procedure goes back to step S2 to repeat the process.

The system determines whether the data (print job) are accepted (step S10); if the data are accepted (in the case of YES), the system determines whether the data are monochrome data from the data type (monochrome or color), i.e., whether the recording portion to be used is on the power saving side (step S11); if the data are monochrome data, i.e., if the recording portion to be used is the monochrome image recording apparatus 2 on the power saving side (in the case of YES), the recording portion (monochrome image recording apparatus 2) is restored (step S12); and the system goes to step S4 to prepare for the print process.

If the data are not accepted at step S10 (in the case of NO), the system repeats the process of step S10. If the data are color data rather than monochrome data, i.e., the recording portion to be used is the color image recording apparatus 1 on the waiting side (in the case of NO), the system goes to step S4 to prepare for the print process.

Figure 11:
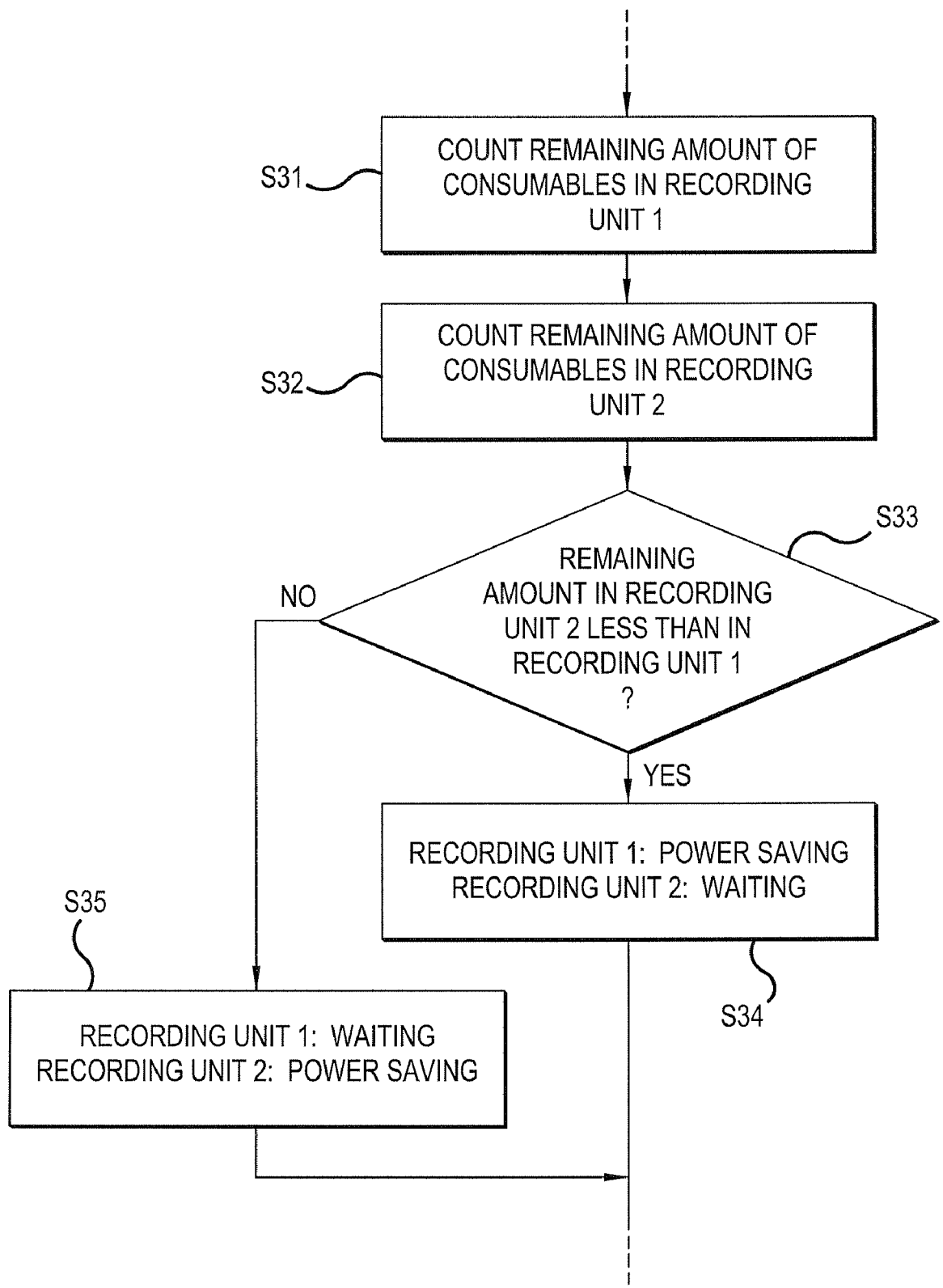
FIG. 11 is an explanatory flowchart of a modified example of a power supply controlling process in the image recording system shown in FIG. 6.

Alternatively, As shown in FIG. 11, Step S9 in FIG. 6 can be replaced with the following steps. More specifically, after the system cancels the timer (step S8), the remaining amount of consumables in the recording portions 1 (Step S31) and the remaining amount of consumables in the recording portions 1 (Step S32) are counted, and the remaining amount of the consumables in the recording portions 1 and 2 are compared (Step S33). If the remaining amount in the recording portion 2 is less than the remaining amount in the recording portion 1, then the recording portion 1 is shifted into the power saving state and the recording portion 2 waits in the recordable state (Step S34). If the remaining amount in the recording portion 2 is greater than the remaining amount in the recording portion 1, then the recording portion 1 waits in the recordable state and the recording portion 2 is shifted into the power saving state (Step S35).

Figure 7:
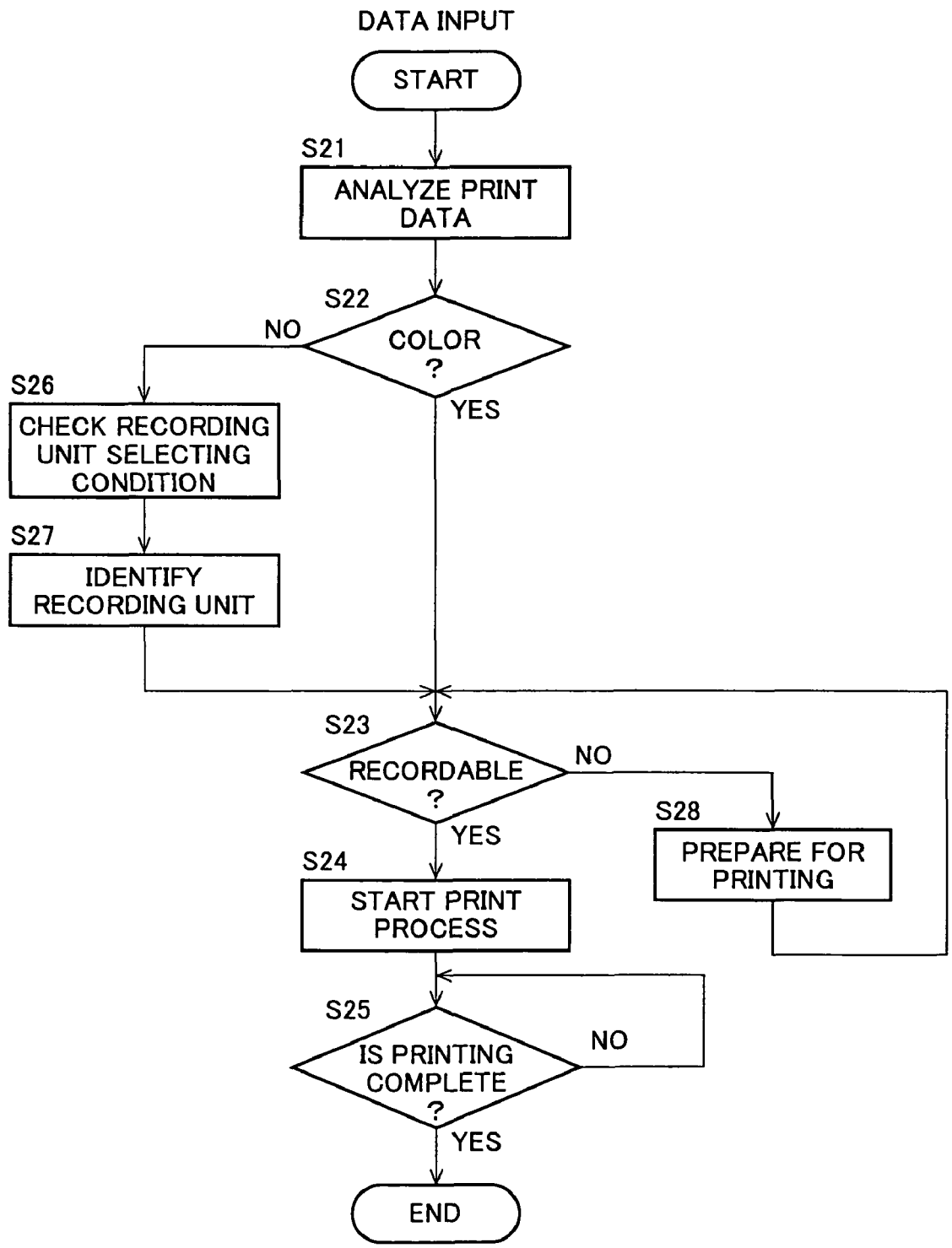
FIG. 7 is an explanatory flowchart of another example of a power supply controlling process in the image recording system described in FIGS. 1 to 5.

FIG. 7 is an explanatory flowchart of another example of a power supply control process in the image recording system described in FIGS. 1 to 5. A process at the time of inputting data to the image recording system will be described in this example with reference to FIG. 7. In this description, it is also assumed that the color-side main controlling portion 1a includes the power supply control function necessary for the image recording system according to the present invention.

The system (color-side main controlling portion 1a) analyzes the input print data (print job) (step S21) to determine whether the data are the color type (step S22). If the data are color data (in the case of YES), it is determined whether the corresponding recording portion (color image recording apparatus 1) is recordable (step S23), and if recordable (in the case of YES), the system starts the print process (step S24) and determines whether the printing is completed (step S25). If the printing is completed (in the case of YES), the process is terminated and if the printing is not completed (in the case of NO), the process of step S25 is repeated.

On the other hand, if the print data are the monochrome type rather than the color type at step S22 (in the case of NO), the system checks the recording portion selecting condition (step S26), identifies the recording portion to be used (step S27), and goes to step S23. If the corresponding recording portion is not recordable at step S23 (in the case of NO), the system prepares for the printing (step S28) and goes back to step S23 to repeat the process.

Figure 8:
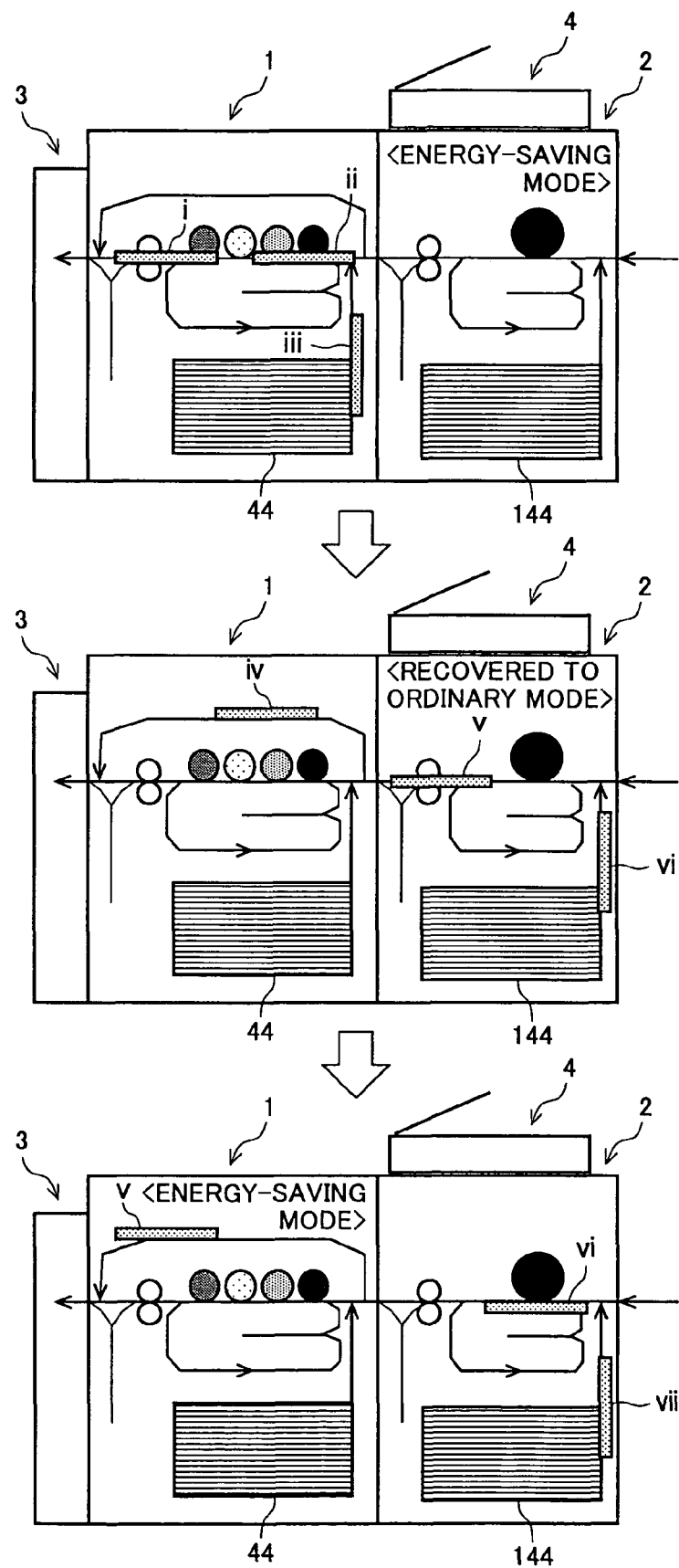
FIG. 8 is an explanatory schematic view of an example of energy-saving-mode entry and recovery processes for each engine in the image recording system described referring to FIGS. 1 to 7.

FIG. 8 is an explanatory schematic view of an example of energy-saving-mode entry and recovery processes for each engine in the image recording system described referring to FIGS. 1 to 7.

In the present system, it is preferable that each engine, that is, each image recording apparatus independently enters an energy-saving mode and each engine independently recovers from the energy-saving mode. Because use of the engines may be biased toward one engine, the energy consumption efficiency is improved by separating the control of the energy-saving mode. In the present system, the power supply controlling portion of the present invention functions effectively for transition to the energy-saving mode and recovery to an ordinary mode.

As shown in the upper portion of FIG. 8, the monochrome image recording apparatus 2 is adapted to enter the energy-saving mode when no job is present for a certain time period in the monochrome engine of the monochrome image recording apparatus 2. At this time, the color engine of the color image recording apparatus 1 executes color printing to the paper sheets i to iii for a color job and ejects the paper sheets to the final processing apparatus 3. As shown in the middle portion of FIG. 8, when a job arrives at the monochrome engine, the monochrome engine recovers from the energy-saving mode, executes monochrome printing to the paper sheets iv to vii, and ejects the paper sheets to the final processing apparatus 3. In contrast, when no job is present for a specific time period in the color engine, as shown in the lower portion of FIG. 8, the color engine of the color image recording apparatus 1 may be entered into the energy-saving mode. The bypass transporting path apparatus 5, etc., are driven to transport the recorded items with monochrome-printed characters thereon.

As described above, in the present system, the monochrome image recording apparatus 2 (and the color image recording apparatus 1) enters a power-saving mode state that stops supply of the power to a portion of the monochrome image recording apparatus 2 (and the color image recording apparatus 1) under a specific condition. By executing this, a power-saving effect in the present system is facilitated.

Together with the power-saving effect, improvement of the performance as the present system is facilitated by enabling the color image recording apparatus 1 to cope with both of color jobs and monochrome jobs by causing the monochrome image recording apparatus 2 capable of recording only monochrome images to first enter the power-saving mode state, instead of the color image recording apparatus 1 capable of recording both color images and monochrome images.

Figure 9:
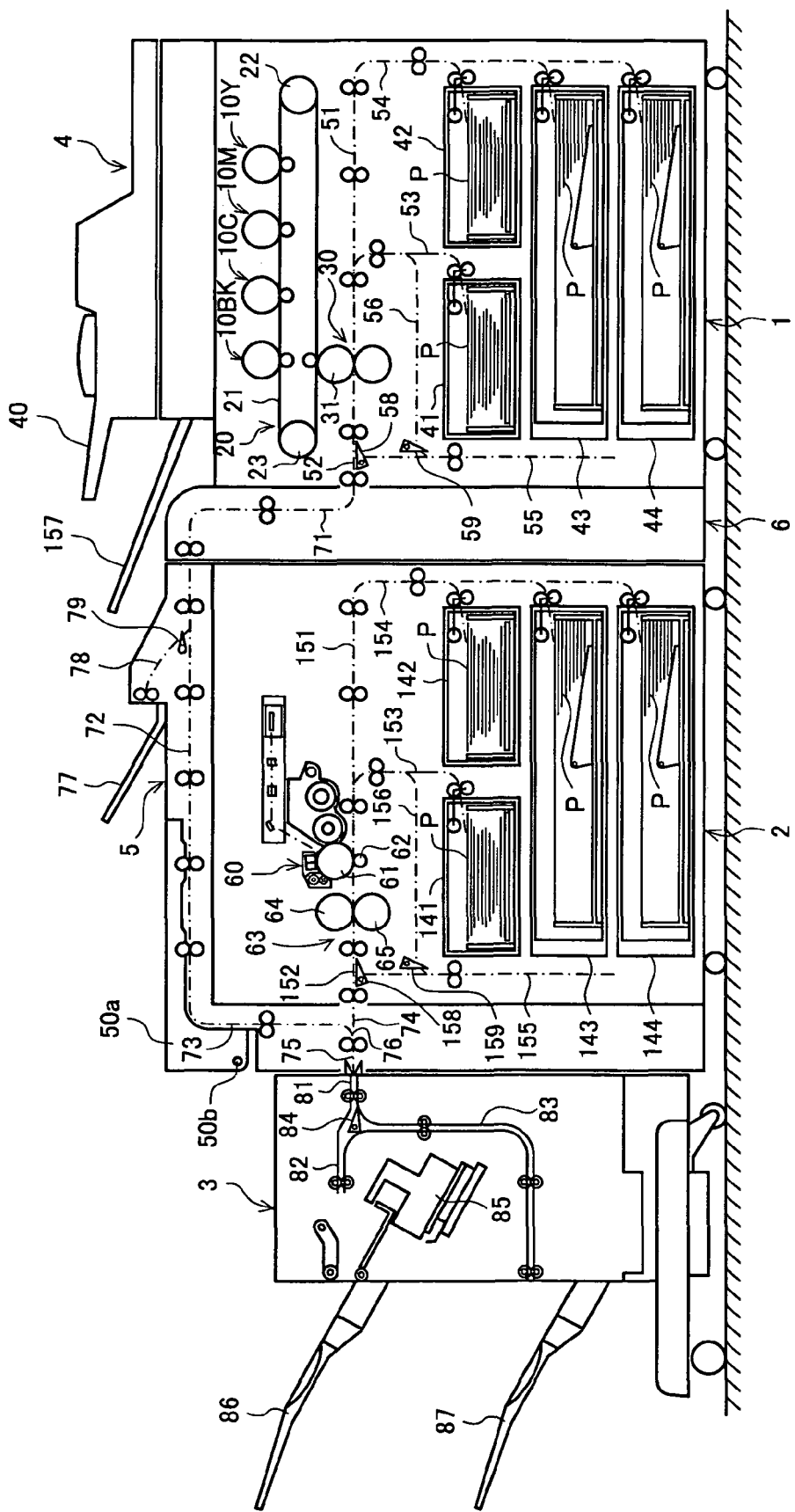
FIG. 9 is a schematic cross-sectional view of an example of the configuration of an image recording system according to another embodiment of the present invention.
Figure 10:
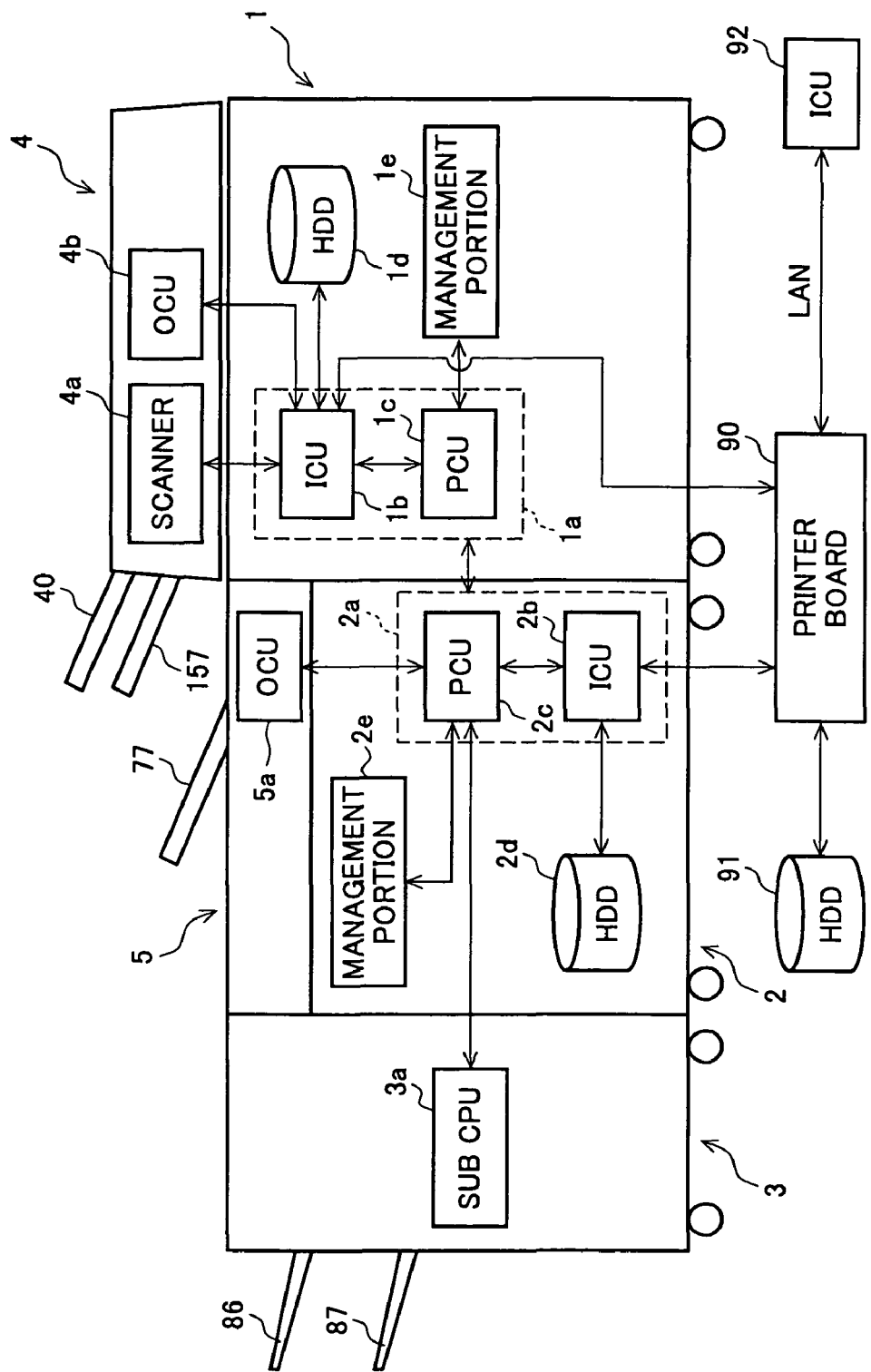
FIG. 10 is a block diagram of an example of the main portion that executes image recording control in the image recording system of FIG. 9.

FIG. 9 is a schematic cross-sectional view of an example of the configuration of an image recording system according to another embodiment of the present invention. FIG. 10 is a block diagram of an example of the main portion that executes image recording control in the image recording system of FIG. 9. Referring to FIGS. 9 and 10, as an example of the system configuration replacing the image recording system of FIGS. 3 and 5, an example formed by exchanging disposition of the color image recording apparatus 1 and the monochrome image recording apparatus 2 of the image recording system of FIGS. 3 and 5 is shown. Therefore, the portions overlapping those in the description referring to FIGS. 3 and 5 are given the same reference numerals and the detailed description thereof is basically omitted.

The present system exemplified in FIG. 9 comprises a monochrome image recording apparatus 2 disposed on the center part, a final processing apparatus 3 disposed on the front side (on the left in the figure) of the monochrome image recording apparatus 2, a color image recording apparatus 1 disposed in the back side (on the right in the figure) of the monochrome image recording apparatus 2, and a color image reading apparatus (color scanner) 4 mounted on the upper portion of the color image recording apparatus 1.

A bypass transporting path apparatus 5 having an inversed L-shape as a side view is disposed such that the apparatus 5 covers over the monochrome image recording apparatus 2 from the front portion to the upper portion of the monochrome image recording apparatus 2. A transporting path connecting apparatus 6 having a housing shape is disposed between the front portion of the color image recording apparatus 1 and the back portion of the monochrome image recording apparatus 2. An upper containing tray 77 is provided above the bypass transporting path apparatus 5. The front portion of the color image recording apparatus 1 is connected with the back portion of the monochrome image recording apparatus 2 through the transporting path connecting apparatus 6. The front portion of the color image recording apparatus 1 is connected with the back portion of the final processing apparatus 3 through the bypass transporting path apparatus 5.

That is, the present system exemplified in FIG. 9 is configured by connecting in series from the front to the back the final processing apparatus 3, the bypass transporting path apparatus 5, the monochrome image recording apparatus 2, the transporting path connecting apparatus 6, and the color image recording apparatus 1. The upper portion of the monochrome image recording apparatus 2 is occupied by the bypass transporting path apparatus 5 having the upper containing tray 77. The upper portion of the color image recording apparatus 1 has no bypass transporting path apparatus and is occupied by the color image reading apparatus 4.

The present system may also be configured by disposing the above monochrome image recording apparatus 2 and color image recording apparatus 1 side by side, providing a recorded item containing portion (or common containing portion) that contains commonly recording media that are recorded (recorded items) to each image recording apparatus, and providing a dedicated containing portion that contains dedicatedly recorded items of the color image recording apparatus 1 (exemplified with the upper containing tray 77 provided above the bypass transporting path apparatus 5) to the above color image recording apparatus 1 such that the dedicated containing portion and the above common containing portion are selectively used.

By configuring as described above, the present system can be configured to contain the recorded items of the color image recording apparatus 1 and the recorded items of the monochrome image recording apparatus 2 together in the common containing portion during distributed processing that uses in parallel the color image recording apparatus 1 and the monochrome image recording apparatus 2. The present system can also be configured to contain the recorded items of the monochrome image recording apparatus 2 in the common containing portion during monochrome-apparatus-alone processing that uses singly the monochrome image recording apparatus 2. The present system can also be configured to contain the recorded items of the color image recording apparatus 1 in the dedicated containing portion during color-apparatus-alone processing that uses singly the color image recording apparatus 1. Thereby, parallel processing of two image recording jobs can be executed smoothly.

The configuration of each of the apparatuses will be described simply.

As shown in FIG. 9, the color image recording apparatus 1 comprises four image forming units 10BK, 10C, 10M, and 10Y, an intermediate transferring unit 20, a transfer fusing unit 30, a first recording paper sheet containing tray 41, a second recording paper sheet containing tray 42, a third recording paper sheet containing tray 43, a fourth recording paper sheet containing tray 44, a horizontal feed transporting path 51, a horizontal ejection transporting path 52, a first vertical transporting path 53, a second vertical transporting path 54, a third vertical transporting path 55, a horizontal return transporting path 56, and an ejection containing tray 157 that contains recording paper sheets of color images that have been image-processed. The color image recording apparatus 1 employs any tandem scheme such as the one described above with referring to FIG. 4, etc., as a method of recording a color image on the recording paper sheet P that is a recording medium.

In the above color image recording apparatus 1, a transporting path to transport the recording paper sheets P is configured as follows. That is, recording of characters and figures onto the recording paper sheets P is executed by the transfer fusing nip formed by the contact of the transfer fusing roller 31 and the pressure roller 32 of the transfer fusing unit 30 and, therefore, the recording paper sheet P needs to be transported to the transfer fusing nip. Therefore, the horizontal feed transporting path 51 that transports and feeds the recording paper sheet P to the transfer fusing nip is formed such that the path 51 extends horizontally from the transfer fusing nip of the transfer fusing unit 30 to the back. The horizontal ejection transporting path 52 that transports and ejects the recording paper sheet P from the transfer fusing nip is formed such that the path 52 extends horizontally from the transfer fusing nip of the transfer fusing unit 30 to the front. The horizontal ejection transporting path 52 is connected with the back end of the bypass transporting path apparatus 5 described later, and is connected with the final processing apparatus 3 described later through this bypass transporting path apparatus 5.

The monochrome image recording apparatus 2 in FIG. 9 will be described. The monochrome image recording apparatus 2 records monochrome characters, figures, etc., onto the recording paper sheets P. In FIG. 9, the monochrome image recording apparatus 2 comprises a monochrome image forming unit 60, a fusing unit 63, a first recording paper sheet containing tray 141, a second recording paper sheet containing tray 142, a third recording paper sheet containing tray 143, a fourth recording paper sheet containing tray 144, a horizontal feed transporting path 151, a horizontal ejection transporting path 152, a first vertical transporting path 153, a second vertical transporting path 154, a third vertical transporting path 155, a horizontal return transporting path 156, and an ejection containing tray 77. The ejection containing tray 77 is a tray that contains recording paper sheets of color images image-processed by the color image recording apparatus 1 in the back (however, the sheets are usually contained in the common containing portion).

The above monochrome image recording apparatus 2 can be configured by replacing the transfer fusing unit 30 in the above color image recording apparatus 1 with the photosensitive drum 61 and the pressure roller 62. That is, the configuration and the disposition of recording paper sheet containing trays that contain the recording paper sheets P and transporting paths that transport the recording paper sheets P in the above monochrome image recording apparatus 2 are completely same as those of the recording paper sheet containing trays and the transporting paths of the above color image recording apparatus 1. Therefore, description for these is omitted. However, different from the color image recording apparatus 1, the horizontal ejection transporting path 152 of the monochrome image recording apparatus 2 is connected with the front portion of the bypass transporting path apparatus 5 described later and is connected with the final processing apparatus 3 described later through this portion. In FIG. 9, the parts concerning the recording paper sheet containing trays that contain the recording paper sheets P and the transporting paths that transport the recording paper sheets P in the monochrome image recording apparatus 2 are denoted by numerals in 100s and the lower two digits of these numerals are same as the numerals of the corresponding parts in the color image recording apparatus 1.

The transporting path connecting apparatus 6 in FIG. 9 will be described. The transporting path connecting apparatus 6 is used attached to the front portion of the color image recording apparatus 1 and has a function of transporting the recording paper sheets P transported by the horizontal ejection transporting path 52 of the color image recording apparatus 1 to the back end of the bypass transporting path apparatus 5 attached to the monochrome image recording apparatus 2.

Therefore, the transporting path connecting apparatus 6 is provided with a bypass ascending transporting path 71. The back end of the bypass ascending transporting path 71 is connected with the front end of the horizontal ejection transporting path 52 of the color image recording apparatus 1. The bypass ascending transporting path 71 has the back end thereof forming a horizontal transporting path and this path bends upward in an ark shape from the back end to the middle portion of the path. The middle portion of the path forms a vertical transporting path and this path bends forward in an arc shape from the middle portion to the front end. The front end forms a horizontal transporting path. The above bypass ascending transporting path 71 is provided with rollers and guides (not shown) driven by a driving portion not shown.

In the above transporting path connecting apparatus 6, the recording paper sheet P delivered from the horizontal ejection transporting path 52 of the color image recording apparatus 1 is transported forward horizontally over a small distance by the back end of the bypass ascending transporting path 71, thereafter, transported upward from a lower position by the middle portion of the bypass ascending transporting path 71, and transported further forward horizontally over a small distance by the front end of the bypass ascending transporting path 71.

The bypass transporting path apparatus 5 in FIG. 9 will be described. The bypass transporting path apparatus 5 is attached to the monochrome image recording apparatus 2 with covering thereover from the front portion to the upper portion of the monochrome image recording apparatus 2. The bypass transporting path apparatus 5 transports the recording paper sheet P delivered from the bypass ascending transporting path 71 of the transporting path connecting apparatus 6 to the final processing apparatus 3. The bypass transporting path apparatus 5 also transports the recoding paper sheet P ejected and delivered from the horizontal ejection transporting path 152 of the monochrome image recording apparatus 2 to the final processing apparatus 3.

Therefore, the bypass transporting path apparatus 5 is provided with a bypass horizontal transporting path 72, a bypass descending transporting path 73, a rear main transporting path 74, and a front main transporting path 75. The back end of the bypass horizontal transporting path 72 is connected with the front end of the bypass ascending transporting path 71 of the transporting path connecting apparatus 6. The front end of the bypass horizontal transporting path 72 is connected with the upper end of the bypass descending transporting path 73. The lower end of the bypass descending transporting path 73 joins and is connected with a main transporting path joining middle portion 76 that is a connecting portion of the rear main transporting path 74 and the front main transporting path 75. The rear end of the front main transporting path 75 is connected with the front end of the horizontal ejection transporting path 152 of the monochrome image recording apparatus 2. Each of the above bypass horizontal transporting path 72, the bypass descending transporting path 73, the rear main transporting path 74, and the front main transporting path 75 is provided with rollers and guides (not shown) driven by a driving portion not shown.

In the above bypass transporting path apparatus 5, the recording paper sheet P delivered by the bypass ascending transporting path 71 of the transporting path connecting apparatus 6 to the bypass horizontal transporting path 72 is transported forward horizontally by the bypass horizontal transporting path 72, is transported vertically downward by the bypass descending transporting path 73, is delivered to the front main transporting path 75 in the main transporting path joining middle portion 76, is transported forward horizontally by the front main transporting path 75, and is delivered to the final processing apparatus 3. While, the recording paper sheet P delivered from the horizontal ejection transporting path 152 of the monochrome image recording apparatus 2 to the rear main transporting path 74 is also transported forward horizontally by the front main transporting path 75 and is delivered to the final processing apparatus 3.

An upper containing transporting path 78 and an upper containing tray 77 are provided above the bypass transporting path apparatus 5 described above. The upper containing transporting path 78 is provided such that the path 78 branches from the bypass horizontal transporting path 72. The path 78 receives, by the switching of a transporting path switching lever 79, the recording paper sheet P transported by the bypass horizontal transporting path 72, transports the sheet P, and the sheet P is contained in the upper containing tray 77. The upper containing tray 77 is provided as a recording paper sheet containing tray dedicated to the color image recording apparatus 1 to enable the recording paper sheet P recorded in the color image recording apparatus 1 to be received and contained on the way to the final processing apparatus 3 without transporting the sheet P thereto. The final processing apparatus 3 in FIG. 9 is the same as that in FIG. 3.

Referring to FIG. 9, the example of another configuration of the present system has been described. However, as shown in FIG. 10, the control in the present system is basically same as that described referring to FIGS. 5 to 8 and, therefore, the detailed description thereof is omitted. However, like the difference between FIG. 3 and FIG. 9, in the example of FIG. 10, the disposition of the color image recording apparatus 1 and the monochrome image recording apparatus 2 is inversed.

For example, the color-side controlling portion in FIG. 10 is provided with the color-side ICU 1b and the color-side PCU 1c as the color-side main controlling portion 1a, and comprises the color-side main controlling portion 1a, the color-side OCU 4b having the color-side operating panel, the color-side HDD 1d, and the color-side management portion e. The monochrome-side controlling portion is provided with the monochrome-side ICU 2b and the monochrome-side PCU 2c as the monochrome-side main controlling portion 2a, and comprises the monochrome-side main controlling portion 2a, the monochrome-side OCU 5a having the monochrome-side operating panel, the monochrome-side HDD 2d, and the monochrome-side management portion 2e.

The same points are that the color-side ICU 1b executes processing concerning color image data processed in the color image recording apparatus 1, and that the monochrome-side ICU 2b executes processing concerning monochrome image data processed in the monochrome image recording apparatus 2. However, the present system may be adapted such that the monochrome-side ICU 2b does not execute the control concerning the color scanner 4a including the processing of the color image data read by the color scanner 4a in the color image reading apparatus 4, and the color-side ICU 1b alone executes this control.

The sub-CPU 3a in the final-processing-side controlling portion executes the control of the final processing apparatus 3. The final-processing-side controlling portion does not need to be provided with any OCU. As the information on the operation instructions to the final processing apparatus 3, information from the color-side OCU 4b of the color-side controlling portion or the monochrome-side OCU 5a of the monochrome-side controlling portion may be used.

The power supply controlling functions necessary for the image recording system of the present invention that are provided to the above color-side main controlling portion 1a and/or monochrome-side main controlling portion 2a, or controlling portion in another housing such as the transporting path connecting apparatus 6 are same as described referring to FIGS. 5 to 8 and the description thereof is omitted.

Although the main controlling portion 1a of the color-side controlling portion includes the power supply controlling function necessary for the present system in the above description, the control function necessary for the present system may be included in the main controlling portion 2a of the monochrome-side controlling portion. Since the process of the main controlling portion 2a in this case can be described by using the description for the color-side main controlling portion 1a, the description thereof is omitted.

The power supply controlling function necessary for the present system may be included in both the monochrome-side controlling portion (the monochrome-side main controlling portion 2a, etc.) and the color-side controlling portion (the color-side main controlling portion 1a, etc.).

That is, the controlling portion of the color image recording apparatus 1 may include a monitoring portion that monitors the monochrome image recording apparatus 2 via the controlling portion of the monochrome image recording apparatus 2, and the power supply controlling portion, or the power supply controlling portion and the operational state monitoring portion. On the other hand, the controlling portion of the monochrome image recording apparatus 2 may include a monitoring portion that monitors the color image recording apparatus 1 via the controlling portion of the color image recording apparatus 1, and the power supply controlling portion, or the power supply controlling portion and the operational state monitoring portion.

The processes such as the monitoring/power supply control can be realized with each portion by incorporating executably into the color-side main controlling portion 1a a program to cause a computer including the CPU in the main controlling portion 1a, the RAM that is a work area, the ROM, etc., to function as the monitoring portion and the power supply controlling portion, or the monitoring portion, the power supply controlling portion, and the operational state monitoring portion and by incorporating executably into the monochrome-side main controlling portion 2a a program to cause a computer including the CPU in the main controlling portion 2a, the RAM that is a work area, the ROM, etc., to function as the monitoring portion and the power supply controlling portion, or the monitoring portion, the power supply controlling portion, and the operational state monitoring portion.

The power supply controlling function necessary for the present system may be included in the controlling portion of the bypass transporting path apparatus 5 or the transporting path connecting apparatus 6 instead of the monochrome-side controlling portion and the color-side controlling portion.

That is, the present system may include a common controlling portion that is incorporated into a housing located between the color image recording apparatus 1 and the monochrome image recording apparatus 2 and that acts as the power supply controlling portion and the operational state monitoring portion to control both the controlling portion of the color image recording apparatus 1 and the controlling portion of the monochrome image recording apparatus 2.

The processes such as the power supply control can be realized with each portion by incorporating executably into the common controlling portion a program to cause a computer including the CPU in the common controlling portion, the RAM that is a work area, the ROM, etc., to function as the power supply controlling portion and the operational state monitoring portion.

The present invention can employ the form of the various programs described above embodiments. These programs may be distributed through a computer-readable recording medium or a network. Typical recording medium storing the programs and data to realize the functions of the present invention can be assumed specifically to be various types of CDs, MOs (Magneto-Optical disks), DVDs, FDs, flash memories, and in addition, various types of ROMs, RAMs, etc. A recording medium as above is set in the image recording system and the programs are transferred to and stored in the inside of the system. Otherwise, a recording medium as above is set in a general-purpose computer and the programs are transferred to and stored in the inside of the image recording system. And an image recording system reads the programs when necessary and, thereby, the functions according to the present invention can be realized.

According to the present invention, the following advantage can be achieved.

According to the present invention, the image recording system includes two image recording apparatuses that can independently record images, shifts one apparatus to a power saving state, and makes the other apparatus wait in a recordable state based on an operational state of each image recording apparatus, and therefore the system can achieve the energy saving and can quickly respond when accepting a print job.

The invention claimed is:

1. An image recording system, comprising:
   a first image recording apparatus;
   a second image recording apparatus attached to the first image recording apparatus, the first and second image recording apparatus being adapted to record images at least independently;
   an operational state monitoring portion that monitors the operational states of the first image recording apparatus and the second image recording apparatus; and
   a power supply controlling portion that automatically performs power supply control of both the first recording apparatus and the second image recording apparatus based on the operational states of the first image recording apparatus and the second image recording apparatus to shift one of the first and second image recording apparatuses to a power saving state while maintaining the other of the first and second image recording apparatuses in a recordable state,
   wherein the power supply controlling portion shifts one of the first and second image recording apparatuses, containing less remaining amount of consumables than the other of the first and second image recording apparatuses, to the power saving state and makes the other image recording apparatus wait in the recordable state,
   wherein the amount of the consumables remaining in the first and second image recording apparatuses can be counted, and
   wherein when the counted amount of the consumables remaining in the one of the first and second image recording apparatuses becomes less than a predetermined amount earlier than the other of the first and second image recording apparatuses, the power supply controlling portion shifts the one of the first and second image recording apparatuses to the power saving mode.

2. The image recording system as defined in claim 1, wherein with regard to the first image recording apparatus and the second image recording apparatus, the first image recording apparatus is a color image recording apparatus including a monochrome image recording function and the second image recording apparatus is a monochrome image recording apparatus.

3. The image recording system as defined in claim 1, wherein if a predetermined time has elapsed while both image recording apparatuses are waiting in a recordable state, the power supply controlling portion shifts the second image recording apparatus to the power saving state and makes the first image recording apparatus wait in the recordable state.

4. The image recording system as defined in claim 1, wherein the second image recording apparatus can be set to be used preferentially and wherein all the consumables are used first in the second image recording apparatus.

5. The image recording system as defined in claim 1, wherein an image recording apparatus allowed to perform a recording process is selected depending on a type of a print job accepted by the image recording system and wherein if the selected image recording apparatus is in the power saving state, the power supply controlling portion returns the selected image recording apparatus to the recordable state.

6. The image recording system as defined in claim 1, wherein a controlling portion of the first image recording apparatus acts as the power supply controlling portion, or the power supply controlling portion and the operational state monitoring portion, to control a controlling portion of the second image recording apparatus.

7. The image recording system as defined in claim 1, wherein a controlling portion of each of the first and second image recording apparatuses includes a monitoring portion, the monitoring portion of one of the first and second image recording apparatus monitors the other of the first and second image recording apparatuses through the controlling portion of the other of the first and second image recording apparatuses, and the power supply controlling portion, or the power supply controlling portion and the operational state monitoring portion.

8. The image recording system as defined in claim 1, further comprising:
   a common controlling portion incorporated into a housing located between the first image recording apparatus and the second image recording apparatus, the common controlling portion acting as the power supply controlling portion, or the power supply controlling portion and the operational state monitoring portion, to control both a controlling portion of the first image recording apparatus and a controlling portion of the second image recording apparatus.

9. A computer-readable storage medium storing a control program for incorporation into the controlling portion of the first image recording apparatus in the image recording system as defined in claim 6, the program allowing a computer to function as the power supply controlling portion, or the power supply controlling portion and the operational state monitoring portion.

10. A computer-readable storage medium storing a control program for incorporation into the controlling portions of the both image recording apparatuses in the image recording system as defined in claim 7, the program allowing a computer to function as the power supply controlling portion, or the power supply controlling portion and the operational state monitoring portion.

11. A computer-readable storage medium storing a control program for incorporation into the common controlling portion in the image recording system as defined in claim 8, the program allowing a computer to function as the power supply controlling portion, or the power supply controlling portion and the operational state monitoring portion.

* * * * *